(12) United States Patent
Yang

(10) Patent No.: US 10,936,359 B2
(45) Date of Patent: Mar. 2, 2021

(54) TASK RESOURCE SCHEDULING METHOD AND APPARATUS

(71) Applicant: Alibaba Group Holding Limited, Grand Cayman (KY)

(72) Inventor: Tianyang Yang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 103 days.

(21) Appl. No.: 16/147,035

(22) Filed: Sep. 28, 2018

(65) Prior Publication Data

US 2019/0034223 A1    Jan. 31, 2019

Related U.S. Application Data

(63) Continuation of application No. PCT/CN2017/077732, filed on Mar. 22, 2017.

(30) Foreign Application Priority Data

Mar. 31, 2016   (CN) .......................... 201610201205.5

(51) Int. Cl.
*G06F 9/48*    (2006.01)
*G06F 9/50*    (2006.01)

(52) U.S. Cl.
CPC .......... *G06F 9/4837* (2013.01); *G06F 9/4887* (2013.01); *G06F 9/50* (2013.01); *G06F 9/5038* (2013.01)

(58) Field of Classification Search
CPC .............................. G06F 9/4837; G06F 9/4887
(Continued)

(56) References Cited

U.S. PATENT DOCUMENTS 5,193,189 A * 3/1993 Flood .................. G05B 19/052
                                                            700/11
6,571,215 B1   5/2003 Mahapatro
(Continued)

FOREIGN PATENT DOCUMENTS

CN        101290585 A       10/2008
CN        102096599 A        6/2011
(Continued)

OTHER PUBLICATIONS

Cao, Qi, Zhi-Bo Wei, and Wen-Mao Gong. "An optimized algorithm for task scheduling based on activity based costing in cloud computing." 2009 3rd International Conference on Bioinformatics and Biomedical Engineering. IEEE, 2009.pp. 1-3 (Year: 2009).*

(Continued)

*Primary Examiner* — Satish Rampuria
(74) *Attorney, Agent, or Firm* — Lee & Hayes, P.C.

(57) ABSTRACT

A task resource scheduling method and apparatus, through determining priority levels of multiple tasks as well as set task deadline times, and determining a preset resource upper bound, based on task priority levels schedules the successive order of executing multiple tasks, and post-scheduling tasks satisfy a first condition, wherein, the first condition is that a time resource conflict does not exist for the tasks, the time resource conflict being that a section exists on a time series where more than one task overlaps, and the sum of the resources occupied in the section having the overlap is greater than the resource upper bound. When multiple tasks are executed according to the present example embodiment, the existing first-arriving, first-compute rule is no longer utilized, but rather scheduling is performed based on the priority levels of tasks.

20 Claims, 22 Drawing Sheets

(58) Field of Classification Search
USPC .................................................... 718/1–108
See application file for complete search history.

(56) References Cited

U.S. PATENT DOCUMENTS

| | | | |
|---|---|---|---|
| 8,589,930 B2* | 11/2013 | Abe .................. | G06F 9/4887 |
| | | | 718/102 |
| 8,959,515 B2 | 2/2015 | Qin | |
| 9,223,628 B2 | 12/2015 | Rastogi | |
| 9,342,356 B2* | 5/2016 | Tsunoda .............. | G06F 9/4881 |
| 2006/0112388 A1 | 5/2006 | Taniguchi et al. | |
| 2006/0190943 A1 | 8/2006 | Haeri | |
| 2008/0313345 A1 | 12/2008 | Bernardin et al. | |
| 2009/0100433 A1* | 4/2009 | Kang .................. | G06F 3/061 |
| | | | 718/103 |
| 2009/0307035 A1 | 12/2009 | Steinglass et al. | |
| 2015/0026691 A1* | 1/2015 | Rastogi .............. | G06F 9/4881 |
| | | | 718/102 |
| 2017/0109217 A1 | 4/2017 | Raman et al. | |
| 2018/0234318 A1 | 8/2018 | Cox et al. | |

FOREIGN PATENT DOCUMENTS

| | | |
|---|---|---|
| CN | 103164258 A | 6/2013 |
| CN | 103729228 A | 4/2014 |
| CN | 104021044 A | 9/2014 |
| CN | 104915251 A | 9/2015 |
| EP | 0553588 A2 | 8/1993 |

OTHER PUBLICATIONS

Dong, Fang, et al. "A grid task scheduling algorithm based on QoS priority grouping." 2006 Fifth International Conference on Grid and Cooperative Computing (GCC'06). IEEE, 2006.pp. 1-4 (Year: 2006).*
Selvarani, S., and G. Sudha Sadhasivam. "Improved cost-based algorithm for task scheduling in cloud computing." 2010 IEEE International Conference on Computational Intelligence and Computing Research. IEEE, 2010.pp. 1-5 (Year: 2010).*
Vignesh, V., K. S. Sendhil Kumar, and N. Jaisankar. "Resource management and scheduling in cloud environment." International journal of scientific and research publications 3.6 (2013): pp. 1-6. (Year: 2013).*
Song, Ying, et al. "Multi-tiered on-demand resource scheduling for VM-based data center." 2009 9th IEEE/ACM International Symposium on Cluster Computing and the Grid. IEEE, 2009. pp. 148-155 (Year: 2009).*
Bellavista, Paolo, et al. "Priority-based resource scheduling in distributed stream processing systems for big data applications." 2014 IEEE/ACM 7th International Conference on Utility and Cloud Computing. IEEE, 2014.pp. 363-370 (Year: 2014).*
Translation of Office Action dated Mar. 25, 2020, from corresponding CN Patent Application No. 2016102012055, 9 pages.
Translation of International Search Report dated Oct. 5, 2017, from corresponding PCT Application No. PCT/CN2017/077732, 2 pages.
Translation of Written Opinion dated Sep. 30, 2018, from corresponding PCT Application No. PCT/CN2017/077732, 6 pages.
Translation of Search Report dated Mar. 19, 2020, from corresponding CN Patent Application No. 2016102012055, 2 pages.
Extended European Search Report dated Oct. 30, 2019, for European Patent Application No. 17773135.3, 9 pages.

* cited by examiner

400

402

AFTER ALL THE UNSCHEDULED TASKS HAVE FINISHED PROCESSING, SELECTING AN ABANDONED FIRST TASK AWAITING SCHEDULING DESIGNATED AS A SECOND TASK AWAITING SCHEDULING, AND CARRYING OUT A BELOW SECOND SCHEDULING OPERATION; WHEREIN, STARTING THE SECOND TASK AWAITING SCHEDULING AT A TAIL END OF THE SCHEDULED TASK SEQUENCE, MOVING FRONTWARD ALONG THE ORDERING BY TIME, AND SELECTING THE FOREMOST POSITION SATISFYING A BELOW THIRD CONDITION AS AN ULTIMATE POSITION OF THE SECOND TASK AWAITING SCHEDULING, THE THIRD CONDITION BEING THAT A TIME RESOURCE CONFLICT DOES NOT EXIST FOR THE TASK SEQUENCE AFTER ADDING THE SECOND TASK AWAITING SCHEDULING

FIG. 4

TASK RESOURCE SCHEDULING METHOD AND APPARATUS

CROSS REFERENCE TO RELATED PATENT APPLICATIONS

This application claims priority and is a continuation of PCT Patent Application No. PCT/CN2017/077732, filed on Mar. 22, 2017, which claims priority to Chinese Patent Application No. 201610201205.5, filed on Mar. 31, 2016 and entitled "TASK RESOURCE SCHEDULING METHOD AND APPARATUS", which are incorporated herein by reference in their entirety.

TECHNICAL FIELD

The present disclosure belongs to the field of allocating computational resources, and particularly involves task resource scheduling methods and apparatuses.

BACKGROUND

In traditional big data computations, each request typically includes multiple tasks, and only after all the tasks included in a request are entirely completed, can data be presented at a frontend for the request.

Currently, tasks corresponding to a request are executed according to a first-come, first-compute rule. Often, tasks of various requests of low importance will arrive first, and the tasks of these requests, upon arrival, are able to occupy machine resources and begin computation. When comparatively long times and comparatively large amounts of resources are needed for computing tasks of requests of comparatively low importance, tasks of various requests of high importance and comparatively early expected completion times which arrive later in order may be impacted to some extent. For example, when such tasks of requests of comparatively high importance arrive, and computing cluster resources have been fully occupied, such tasks of requests of comparatively high importance cannot be computed on a timely basis, and ultimately the presentation of data at a frontend is impacted.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides task resource scheduling methods and apparatuses, operative to solve the problem wherein tasks corresponding to a high-importance request cannot be computed when executing tasks according to a first-come, first-compute rule, impacting the presentation of data for the request at a frontend.

To realize the above-mentioned goal, the present disclosure provides a task resource scheduling method, including:

Determining priority levels and set task deadline times of multiple tasks;

Determining a preset resource upper bound;

Based on the priority levels of the tasks, scheduling the successive order of executing the multiple tasks, the post-scheduling tasks satisfying a first condition, the first condition being that a time resource conflict does not exist between tasks, the time resource conflict being that a section exists on a time series where more than one task overlaps, and the sum of the resources occupied in the section having the overlap is greater than the resource upper bound.

To realize the above-mentioned goal, the present disclosure provides a task resource scheduling apparatus, including:

A determining module, operative to determine priority levels of multiple tasks, set task deadline times, and preset resource upper bounds;

A scheduling module, operative to, based on task priority levels, schedule the successive order of executing multiple tasks, the post-scheduling tasks satisfying a first condition, the first condition being that a time resource conflict does not exist between tasks, the time resource conflict being that a section exists on a time series where more than one task overlaps, and the sum of the resources occupied in the section having the overlap is greater than the resource upper bound.

The task resource scheduling method and apparatus provided by the present disclosure, through determining priority levels of multiple tasks as well as set task deadline times, and determining a preset resource upper bound, based on task priority levels schedule the successive order of executing multiple tasks, and post-scheduling tasks satisfy a first condition, wherein, the first condition is that a time resource conflict does not exist for the tasks, the time resource conflict being that a section exists on a time series where more than one task overlaps, and the sum of the resources occupied in the section having the overlap is greater than the resource upper bound. When multiple tasks are executed according to the present example embodiment, the existing first-come, first-compute rule is no longer utilized, but rather scheduling is performed based on the priority levels of tasks; through the above-mentioned scheduling method, each task may be maintained as executed ordered by level, ensuring as much as possible that tasks corresponding to high-level requests preferentially obtain resources, and thereby may be preferentially executed, which is advantageous for the requests to present data at a frontend.

BRIEF DESCRIPTION OF THE DRAWINGS

FIG. 4 is a flowchart of a task resource scheduling method according to a fourth example embodiment provided by the present disclosure.

DETAILED DESCRIPTION

The below, in combination with the drawings, provides a detailed description of task resource scheduling methods and apparatuses provided by example embodiments of the present disclosure.

First Example Embodiment

Figure 1:
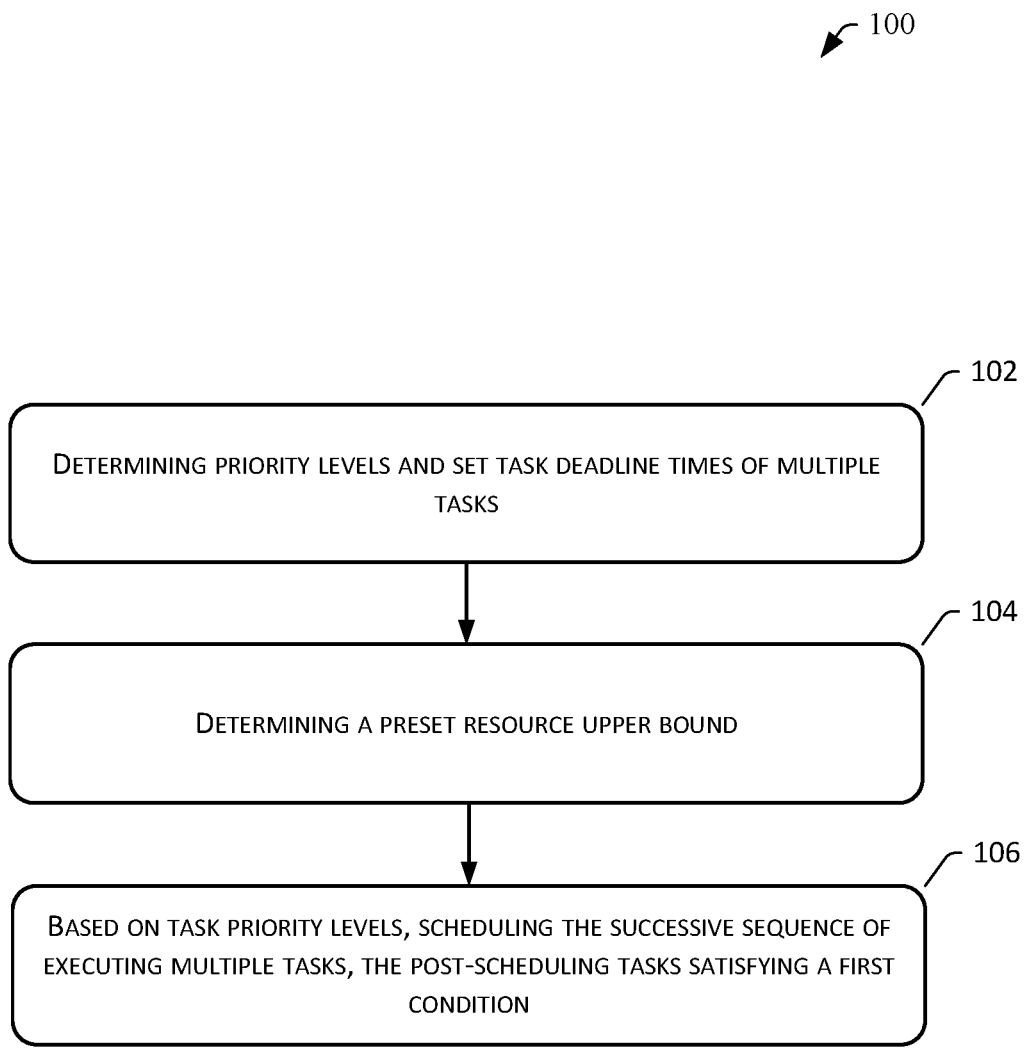
FIG. 1 is a flowchart of a task resource scheduling method according to a first example embodiment provided by the present disclosure.

FIG. 1 illustrates a flowchart of a task resource scheduling method 100 according to a first example embodiment of the present disclosure. The task resource scheduling method includes the following steps:

Step 102, determining priority levels and set task deadline times of multiple tasks.

According to the present example embodiment, each task corresponds to a priority level, and different tasks may have the same priority level. Different tasks may belong to a same request, priority levels of tasks among different requests may be different, and priority levels of all the tasks of the same request are the same. Furthermore, a task deadline time is set up for each request, and tasks included in the request should be completed within the task deadline time.

Step 104, determining a preset resource upper bound.

To ensure that a computing cluster executing tasks may operate efficiently, a resource upper bound needs to be set up for the computing cluster executing tasks, where the operational efficiency of the computing cluster is comparatively high within the resource upper bound, and when the resource upper bound is exceeded, abnormalities may appear during the process of executing tasks.

Step 106, based on task priority levels, scheduling the successive order of executing multiple tasks, the post-scheduling tasks satisfying a first condition.

Herein, the first condition is that a time resource conflict does not exist for the tasks, a time resource conflict being that a section exists on a time series where more than one task overlaps, and the sum of the resources occupied in the section having the overlap is greater than the resource upper bound. A time resource conflict, in particular, is that a section exists on a time series where more than one task of a same type overlap, and the sum of the resources occupied in the section having the overlap is greater than the resource upper bound.

To ensure that important tasks may be executed first as much as possible, multiple tasks need to be ordered according to the determined priority levels of tasks, where in particular, tasks of different types exist among the multiple tasks, dependent relationships may exist between tasks of different types among the multiple tasks, in normal scenarios, dependent relationships exist between tasks of different types of a same request, and the successive order of executing multiple tasks is scheduled based on the priority levels of tasks and dependent relationships of tasks. According to the present example embodiment, tasks of different requests are scheduled according to the order of priority levels, and tasks of the same request need to be scheduled based on dependent relationships between tasks.

After scheduling, it is necessary to ensure that the post-scheduling tasks satisfy a first condition, that is, a time resource conflict does not exist between tasks. According to the present example embodiment, a time resource conflict is that a section exists on a time series where more than one task overlaps, and the sum of the resources occupied in the section having the overlap is greater than the resource upper bound.

Overlaps in a time series indicate that multiple tasks execute in parallel within a time period, where the starting times of multiple tasks overlapping in a time series may be the same or may be different, and the completion times may be the same or may be different, but concurrent execution will be within one period of time.

Furthermore, post-scheduling tasks also satisfy a second condition, that is, the completion times of all the tasks do not exceed their set task deadline times. This is to say, all post-scheduling tasks need to be completed within respective set task deadline times.

Furthermore, if tasks exist that cannot satisfy the first condition and the second condition the tasks are placed for processing after scheduling is completed for the other tasks.

A task resource scheduling method provided by the present disclosure, through determining priority levels of multiple tasks as well as set task deadline times, determines a preset resource upper bound, and based on task priority levels schedules the successive order of executing multiple tasks, and post-scheduling tasks satisfy a first condition, wherein, the first condition is that a time resource conflict does not exist for the tasks, the time resource conflict being that a section exists on a time series where more than one task overlaps, and the sum of the resources occupied in the section having the overlap is greater than the resource upper bound. When multiple tasks are executed according to the present example embodiment, the existing first-come, first-compute rule is no longer utilized, but rather scheduling is performed based on the priority levels of tasks; through the above-mentioned scheduling method, execution of each task may be maintained to be ordered by level, ensuring as much as possible that tasks corresponding to high-level requests preferentially obtain resources, and thereby may be preferentially executed, which is advantageous for the requests to present data at a frontend.

Second Example Embodiment

Figure 2:
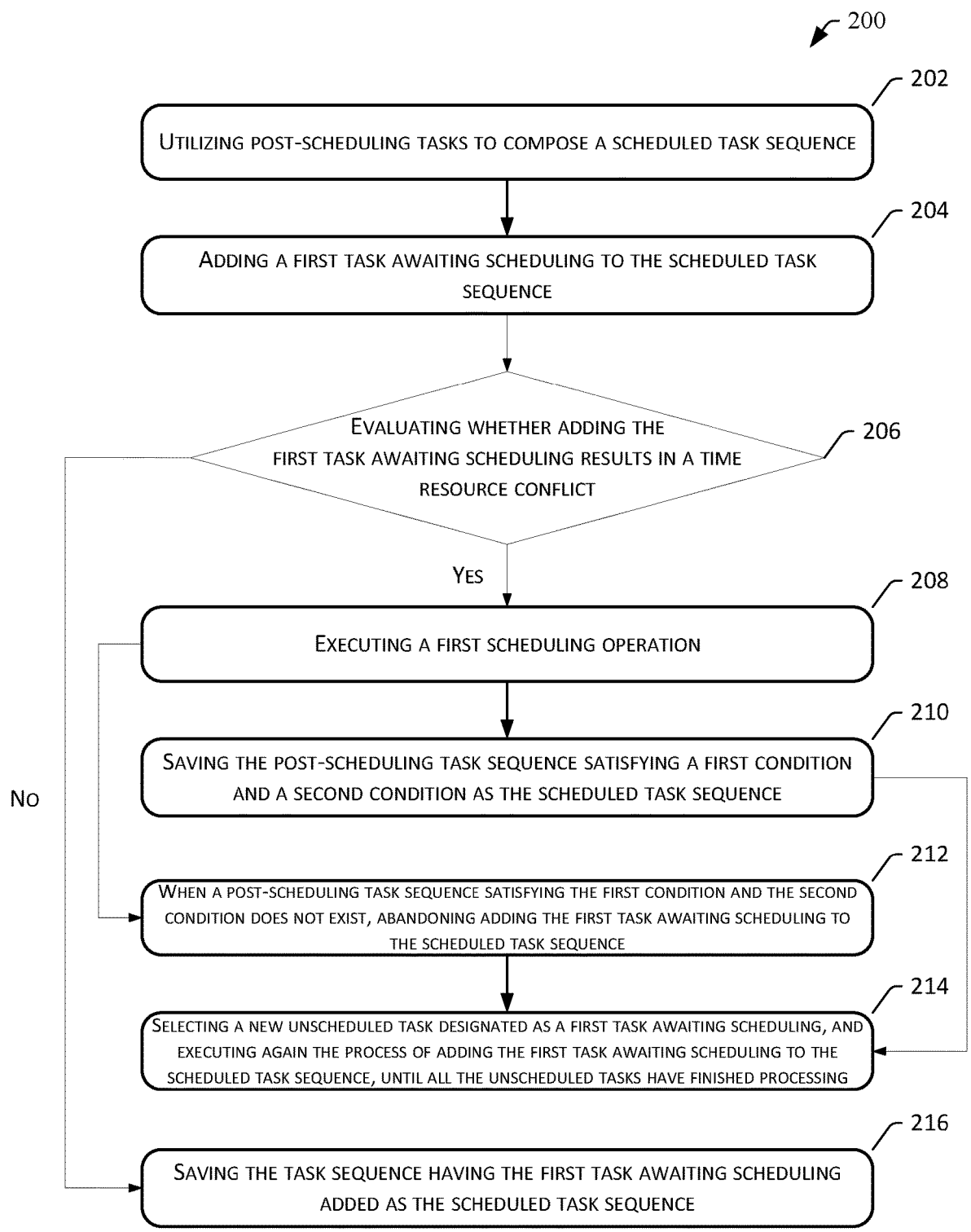
FIG. 2 is a flowchart of a task resource scheduling method according to a second example embodiment provided by the present disclosure.

FIG. 2 illustrates a flowchart of a task resource scheduling method 200 according to a second example embodiment provided by the present disclosure. The task resource scheduling method includes the following steps:

Step 202, utilizing post-scheduling tasks to compose a scheduled task sequence.

Step 204, adding a first task awaiting scheduling to the scheduled task sequence.

Herein, the priority levels of the tasks among the scheduled task sequence are higher than or equal to the priority level of the first task awaiting scheduling, and the scheduled task sequence satisfies a first condition, wherein, the first condition is that a time resource conflict does not exist for the tasks, a time resource conflict being that the sum of the resources occupied in a section on a time series where more than one task of the same type overlaps is greater than the resource upper bound corresponding to the task type.

According to the present example embodiment, each task corresponds to a priority level, and different tasks may have the same priority level. Different tasks may belong to a same request, priority levels of tasks of different requests may be different, and priority levels of all the tasks belonging to a same request are the same.

To ensure preferential execution of high-level tasks, the present example embodiment performs resource scheduling according to a descending order of priority levels of tasks. When performing resource scheduling upon a first task awaiting scheduling, the first task awaiting scheduling needs to be added into a scheduled task sequence, wherein priority levels of tasks in the scheduled task sequence are higher than or equal to the priority level of the first task awaiting scheduling. To ensure tasks in the scheduled task sequence may be executed, first it is necessary to ensure that a time resource conflict does not exist between tasks in the scheduled task sequence. A time resource conflict is that the sum of the resources occupied in a section on a time series where tasks of a same type overlap is greater than a preset resource upper bound. Conditions for analyzing overlaps in a time series are: the starting time of a first task awaiting scheduling is less than or equal to the completion time of tasks of the same type in the scheduled task sequence, and the starting times of tasks of the same type in the scheduled task sequence are less than or equal to the completion time of the first task awaiting scheduling. Overlaps in a time series indicate that multiple tasks execute in parallel within a time period, where the starting times of multiple tasks overlapping in a time series may be the same or may be different, and the completion times may be the same or may be different, but concurrent execution will be within one period of time.

According to the present example embodiment, a resource upper bound is set in advance, and a time resource conflict refers to the sum of the resources occupied by tasks of the same type executing in parallel within one period of time being greater than the resource upper bound.

Step 206, evaluating whether adding the first task awaiting scheduling results in the time resource conflict.

The first task awaiting scheduling needs to occupy certain resources and time; first, tasks of the same type overlapping with the first task awaiting scheduling in a time series are obtained, and then whether the resources occupied by the first task awaiting scheduling and the tasks of the same type overlapping in a time series exceed the resource upper bound is evaluated, that is, whether adding the first task results in a time resource conflict is evaluated.

If the evaluation result is yes, step 208 is executed, and if the evaluation result is no, step 216 is executed.

Step 208, executing a first scheduling operation.

Herein, the first scheduling operation includes:

Adjusting rearward along the time series one or more first overlapping tasks which, with the first task awaiting scheduling, produce a time resource conflict, or, adjusting rearward along the time series one or more first overlapping tasks as well as all or some tasks of the same type as the first task awaiting scheduling on the subsequent time series, and generating a post-adjustment task sequence satisfying the first condition and a second condition.

Herein, the second condition is: the completion times of all the tasks do not exceed their set task deadline times.

A first kind of operation during execution of the first scheduling operation: the particular process of adjusting rearward along the time series one or more first overlapping tasks which, with the first task awaiting scheduling, produce a time resource conflict, and obtaining a post-adjustment task sequence satisfying a first condition and a second condition, is as follows:

Adjusting one or more first overlapping tasks rearward along the time series, and whenever, after adjusting rearward, one or more first overlapping tasks has a time resource conflict with tasks thereafter within the scheduled task sequence, continuing to adjust the one or more first overlapping tasks rearward, and upon obtaining a post-scheduling task sequence satisfying the first condition, executing step 210; and if during the process of adjusting the one or more first overlapping tasks rearward, the completion time of some task exceeds its set task deadline time, indicating that a post-scheduling task sequence satisfying the first condition and the second condition does not exist, executing step 212.

A second kind of operation during execution of the first scheduling operation: adjusting rearward along the time series one or more first overlapping tasks as well as all or some tasks of the same type as the first task awaiting scheduling on the subsequent time series, and obtaining a post-adjustment task sequence satisfying the first condition and the second condition.

After the second kind of operation, during the operation of adjusting rearward along the time series one or more first overlapping tasks as well as all or some tasks of the same type as the first task awaiting scheduling on the subsequent time series, the successive order of tasks of the same type among the scheduled task sequence needs to be maintained. This is to say, the successive order of tasks of the same type within the obtained post-adjustment task sequence satisfying the first condition and the second condition is the original successive order of tasks among the scheduled tasks.

Details of the process of the second kind of operation are as follows: moving the one or more first overlapping tasks designated as target task(s) rearward along the time series until the time resource conflict(s) produced by the target task(s) disappear(s), then stopping. If the completion time(s) of the target task(s) post-moving do(es) not exceed respective set task deadline time(s), then it is further evaluated whether, post-moving, a second overlapping task exists which produces a time resource conflict with the target task(s), and if, post-moving, a second overlapping task exists which produces a time resource conflict with the target task(s), one or more second overlapping tasks is designated as the new target task(s) and the above-mentioned operation of moving the target task(s) rearward along the time series is executed again, if a second overlapping task which produces a time resource conflict with the target task(s) does not exist, it is decided that the current post-scheduling task sequence satisfies the first condition and the second condition, and step 210 is executed.

If the completion time(s) of the target task(s) post-moving exceed(s) respective set task deadline time(s), it is evaluated that a post-scheduling task sequence satisfying the first condition and the second condition does not exist, and execution returns to executing step 212 and abandons the operation of adding the first task awaiting scheduling to the scheduled task sequence.

According to the present example embodiment, a time series includes time points composed of the starting times and completion times of each task contained in the scheduled task sequence, and when adjusting tasks along the time series, in particular tasks are adjusted along the time points of the time series.

Herein, all the tasks which have a time resource conflict with the first task awaiting scheduling may be ordered according to their completion times from earliest to latest, and then, by order from latest to earliest, from among the above-mentioned all the tasks which have a time resource conflict with the first task awaiting scheduling, one or more first overlapping tasks are selected successively. Or, all the tasks which have a time resource conflict with the first task awaiting scheduling are ordered according to their starting times from earliest to latest, and then, by order from latest to earliest, from among the above-mentioned all the tasks which have a time resource conflict with the first task awaiting scheduling, one or more first overlapping tasks are selected. Or, based on the resources occupied by the first task awaiting scheduling and the resources occupied by all the tasks which have a time resource conflict with the first task awaiting scheduling, the resource amount that needs to be freed, in order to satisfy the resource demand of the first task awaiting scheduling, may be derived. After determining the resource amount, one or more first overlapping tasks may be selected from among all the tasks which have a time resource conflict with the first task awaiting scheduling.

Here it should be stated that, the selection processes of the second overlapping tasks and the first overlapping tasks are similar, and shall not be further detailed herein.

Step 210, saving the post-scheduling task sequence satisfying the first condition and the second condition as the scheduled task sequence.

After saving the post-scheduling task sequence satisfying the first condition and the second condition as the scheduled task sequence, the processing of the first task awaiting scheduling is completed, and step 214 may be executed.

Step 212, when a post-scheduling task sequence satisfying the first condition and the second condition does not exist, abandoning adding the first task awaiting scheduling to the scheduled task sequence.

When a post-adjustment task sequence satisfying the first condition and the second condition is not found, and adding the first task awaiting scheduling to the scheduled task sequence is abandoned, at this time processing of the first task awaiting scheduling is completed, and step 214 may be executed.

Step 214, selecting a new unscheduled task designated as a first task awaiting scheduling, and executing again the process of adding the first task awaiting scheduling to the scheduled task sequence, until all the unscheduled tasks have finished processing.

Step 216, saving the task sequence having the first task awaiting scheduling added as the scheduled task sequence.

Furthermore, if in step 206 it was evaluated that adding the first task awaiting scheduling does not result in a time resource conflict, the first task awaiting scheduling may be directly added to the scheduled task sequence, and the task sequence having the first task awaiting scheduling added is saved as the scheduled task sequence.

A task resource scheduling method provided by the present disclosure adds a first task awaiting scheduling to a scheduled task sequence, wherein, the priority level of the first task awaiting scheduling is lower than or equal to the priority levels of the tasks among the scheduled task sequence, and when adding the first task awaiting scheduling results in a time resource conflict, a first scheduling operation is performed upon the first task awaiting scheduling, and the scheduled task sequence is adjusted, to arrive at the goals of a post-adjustment task sequence not having a time resource conflict, as well as of the completion times of all the tasks among the scheduled task sequence not exceeding their set task deadline times. Through the above-mentioned scheduling processing, each task may be maintained as executed by level order, ensuring as much as possible that tasks corresponding to high-level requests preferentially obtain resources, and thereby may be preferentially executed, which is advantageous for the requests to present data at a frontend.

Third Example Embodiment

Figure 3:
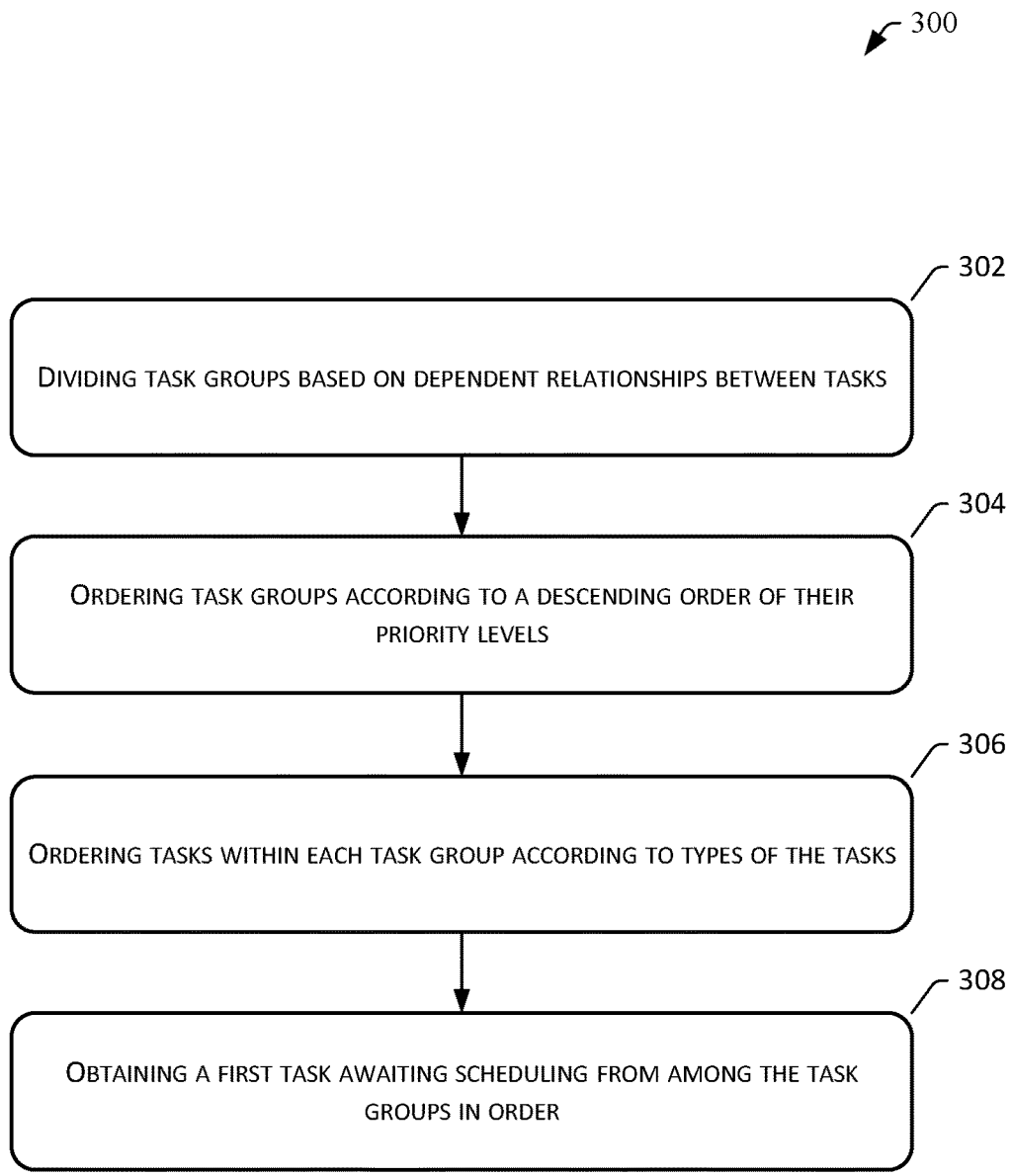
FIG. 3 is a flowchart of a task resource scheduling method according to a third example embodiment provided by the present disclosure.

FIG. 3 is a flowchart of a task resource scheduling method 300 according to a third example embodiment provided by the present disclosure. Upon the basis of the above-mentioned second example embodiment, before adding a first task awaiting scheduling to the scheduled task sequence, the following steps are included:

Step 302, dividing task groups based on dependent relationships between tasks.

Herein, each task group includes: a first-type task which detects data status, a second-type task which computes data and a third-type task which collects computation results; the second-type task depends upon the first-type task, and the third-type task directly depends upon the second-type task, and indirectly depends upon the first-type task.

In practical applications, dependent relationships exist between tasks of a same request, and the tasks are grouped based on the dependent relationships existing between the tasks. In normal scenarios, a task group includes: a first-type task which examines data status, a second-type task which computes data and a third-type task which collects computation results. Herein, the first-type task is utilized to examine whether the status of data attains a computable degree, where usually synchronization progress of data is examined. The second-type task is utilized to perform computation upon data, usually costing comparatively long times, and the third-type task is utilized to perform summarized computations upon computation results from the second-type task, and transferring the results to a frontend for data presentation.

Step 304, ordering task groups according to a descending order of their priority levels.

After obtaining each task group, ordering is performed upon all task groups. In particular, first running durations and resources occupied for each task among each task group are obtained, the running durations and the resources occupied for each task are individually multiplied, and then each product is summed resulting in a cumulative value of each task group, and based on the cumulative value of each task group and a preset level of each task group, a priority level of each task group is obtained, and then each task group is ordered according to priority levels from largest to smallest. Priority levels of task groups may be set based on the importance of corresponding requests.

In particular, targeting each task group, historical data of tasks within the group within set time periods is collected, the collected historical data is analyzed, running information of tasks within task groups is obtained, and based on running information of task groups, starting times, completion times and running durations are obtained for each task within the task groups.

Obtaining starting times of tasks proceeds as follows: collecting historical data of task starting times within a set time period, converting the time to a number, which in practical applications time is normally Unix time, the cumulative seconds starting from 00:00:00 on Jan. 1, 1970 to now, using all numbers to compute an average value and a standard deviation, and after filtering out from all historical data the historical data which is two standard deviations larger or smaller than the average value for elimination, utilizing the remaining historical data to re-compute the average value, the average value being designated as an ultimate starting time of a task.

Obtaining running durations of tasks proceeds as follows: obtaining historical data of running times within task set durations, computing an average value and a standard deviation, filtering out from all historical data the historical data which is two standard deviations larger or smaller than the average value for elimination, and utilizing the remaining historical data to re-compute the average value, the average value being designated as an ultimate running duration of a task.

After obtaining the starting time and running duration of a task, the completion time of the task can be found.

Optionally, running information includes the starting time and completion time of a first-type task and the running durations of a second-type task and a third-type task. Since dependent relationships exist between tasks, after obtaining the starting time and the running duration of the first-type task, the starting time of the second-type task may be obtained, and based on the running duration of the second-type task that is obtained, the completion time of the second-type task may be found from computation. Correspondingly, by obtaining the completion time of the second-type task, based on the running duration of the third-type task that is obtained, the completion time of the third-type task may be obtained.

In practical applications, a task may depend upon multiple parent node tasks, and may only depend upon a single parent node task. For example, if the target task(s) are second-type tasks, they may depend upon multiple first-type tasks, or may only depend upon a single first-type task, with the first-type task(s) being the parent node task(s) of the target task(s).

When obtaining the starting times of the target task(s), it is evaluated whether the first task awaiting scheduling has a parent node task, the parent node task being a task one level higher which the first task awaiting scheduling directly depends upon, for example when the first task awaiting scheduling is a second-type task, then its parent node task is the first-type task which it depends upon. Upon evaluating that there is a parent node task, it is needed to find all parent node task(s) upon which it depends, and to find the completion times of all parent node task(s) of the target task(s), and then with the latest completion time among all the parent node tasks designated as the starting time of the target task(s), and furthermore obtaining running durations based on the historical data of the target task(s), the completion times of the target task(s) may be found.

According to the present example embodiment, priority levels of task groups are set in advance, and during the process of ordering the resource occupation scenarios and running durations of tasks among each task group are considered, and after ordering by these factors combined, tasks having high importance and high task volume are ordered earlier, and tasks having low importance and low task volume are ordered later, so that important tasks may run as early as possible, thereby ensuring that completion times of important tasks are comparatively earlier.

Step 306, ordering tasks within each task group according to types of the tasks.

According to the present example embodiment, after task groups are ordered, since dependent relationships still exist between task groups, only when depended-upon tasks one level higher, that is, parent node tasks, have completed, may tasks one level lower execute, and tasks within a group still need to be ordered, with, within a group, first-type tasks being ordered before second-type tasks, and second-type tasks being ordered before third-type tasks, so that according to an order of task types resources may be deployed for tasks among the task groups, and thereby arriving at the goal of first executing first-type tasks, then executing second-type tasks, and finally executing third-type tasks.

Step 308, obtaining a first task awaiting scheduling from among the task groups in order.

After the task groups and the tasks among the task groups have been ordered according to types of the tasks, a first task awaiting scheduling is obtained from among the task groups in order. For example, three task groups are included: task group 1, task group 2 and task group 3. Herein, they are ordered as task group 2, task group 3 and task group 1, and after ordering a first task awaiting scheduling is first preferentially obtained according to task type from among task group 2, and a first task awaiting scheduling is then obtained from among task group 3 and then task group 1.

Here it should be stated that, when initially carrying out task resource scheduling, since scheduling has not yet started for tasks awaiting scheduling, currently tasks have yet to be added to the scheduled task sequence, that is, currently the scheduled task sequence is still empty, and first all or some tasks are selected from the task group having the highest priority level to generate a scheduled task sequence, and then, a first task awaiting scheduling is obtained from among the task groups in order, to carry out the procedure of scheduling processing.

The task resource scheduling method provided by the present example embodiment, before adding a first task awaiting scheduling to a scheduled task sequence, performs grouping upon tasks, and orders task groups according to priority levels, performs ordering within groups according to types of the tasks, and after ordering obtains a first task awaiting scheduling according to the order. According to the present example embodiment, tasks associated with a same request are divided into one group, and with regard to a same task group, tasks of a same type among each group may be scheduled together, so that tasks among the task group may successively execute, and when obtaining the first task awaiting scheduling it is obtained according to the order, which is able to maintain each task group executing according to the order, ensuring as much as possible that tasks corresponding to high-importance requests preferentially obtain resources, and thereby may be preferentially executed, which is advantageous for the requests to present data at a frontend.

Fourth Example Embodiment

FIG. 4 is a flowchart of a task resource scheduling method 400 according to a fourth example embodiment provided by the present disclosure. Upon the basis of the above-mentioned example embodiments, after abandoning adding a first task awaiting scheduling to the scheduled task sequence, the following steps are included:

Step 402, after all the unscheduled tasks have finished processing, selecting an abandoned first task awaiting scheduling designated as a second task awaiting scheduling, and carrying out a below second scheduling operation.

Herein, starting the second task awaiting scheduling at a tail end of the scheduled task sequence, moving frontward along the time series, and selecting the foremost position satisfying a below third condition designated as an ultimate position of the second task awaiting scheduling, the third condition being that a time resource conflict does not exist for the task sequence after adding the second task awaiting scheduling.

After all the unscheduled tasks have finished processing, due to the setting of the first condition, in the first example embodiment various scenarios occur where a first task awaiting scheduling cannot be added to the scheduled task sequence at the time, and in this above-mentioned scenario, the first task awaiting scheduling is abandoned, but in order to ensure the request is completed, a below second scheduling operation needs to be newly carried out upon the abandoned first task awaiting scheduling.

In particular, with the abandoned first task awaiting scheduling designated as a second task awaiting scheduling, starting the second task awaiting scheduling at the tail end of the scheduled task sequence, moving frontward along the time series, and selecting the foremost position satisfying a below third condition designated as an ultimate position of the second task awaiting scheduling. Herein, the third condition is: a time resource conflict does not exist for the task sequence after adding the second task awaiting scheduling.

According to the present example embodiment, the time series includes time points composed of the starting time and completion time of each task contained within the scheduled task sequence, and moving frontward along the time series, that is, moving the second task awaiting scheduling starting from the latest time point successively frontward, and whenever moving to a time point whether the task sequence after adding the second task awaiting scheduling satisfies the third condition needs to be evaluated, that is, whether a time resource conflict exists for the task sequence after adding the second task awaiting scheduling, if it is evaluated that the third condition is satisfied, the second task awaiting scheduling continues to be moved frontward, until moving to a time point where the task sequence after adding the second task awaiting scheduling does not satisfy the third condition, and the foremost position satisfying the third condition being designated as an ultimate position of the second task awaiting scheduling.

After obtaining the ultimate position of the second task awaiting scheduling, the time point of the ultimate position serves as the starting time of the second task awaiting scheduling.

According to the present example embodiment, the second task awaiting scheduling is adjusted rear-to-front along the time series, in order for the second task awaiting scheduling to obtain resources as early as possible, which may enable the completion time of the second task awaiting scheduling to be as close as possible to its set task deadline time, causing the completion time to not be too much later than its deadline time.

For better understanding of the task resource scheduling method provided by the present example embodiment, an explanatory example follows:

Suppose that resources need to be deployed for four task groups, the four task groups being respectively task group 1, task group 2, task group 3 and task group 4. The particular process of the task resource scheduling method illustrated herein is as follows:

After a weighted calculation according to levels, running times and occupied resources, the priority level of each task group is found, the order from largest to smallest priority level being: task group 2, task group 4, task group 1, and task group 3.

Each task group includes three types of tasks: a first-type task, "examining data status," called an A-type task in this example, a second-type task, "computing data," called a B-type task in this example and a third-type task, "collecting computation results," called a C-type task in this example. The three types of tasks have dependent relationships, where B-type tasks depend upon A-type tasks, and C-type tasks directly depend upon B-type tasks, and indirectly depend upon A-type tasks.

Herein, task group 2 includes two A-type tasks respectively recorded as: $2_{A1}$, $2_{A2}$, includes two B-type tasks respectively recorded as: $2_{B1}$, $2_{B2}$, wherein, $2_{B1}$ depends upon $2_{A1}$, and $2_{B2}$ depends upon $2_{A2}$, and includes one C-type task respectively recorded as: $2_C$.

Task group 4 includes three A-type tasks respectively recorded as: $4_{A1}$, $4_{A2}$, $4_{A3}$, includes two B-type tasks respectively recorded as: $4_{B1}$, $4_{B2}$, wherein, $4_{B1}$ depends upon $4_{A1}$, and $4_{B2}$ depends upon $4_{A2}$ and $4_{A3}$, and includes one C-type task respectively recorded as: $4_C$.

Task group 1 includes one A-type task recorded as: $1_{A1}$, includes two B-type tasks respectively recorded as: $1_{B1}$, $1_{B2}$, wherein, $1_{B1}$ and $1_{B2}$ depend upon $4_{A1}$, and includes one C-type task respectively recorded as: $1_C$.

Task group 3 includes one A-type task recorded as: $3_{A1}$, includes one B-type task recorded as: $3_{B1}$, wherein, $3_{B1}$ depends upon $3_{A1}$, and includes one C-type task respectively recorded as: $3_C$.

Figure 5:
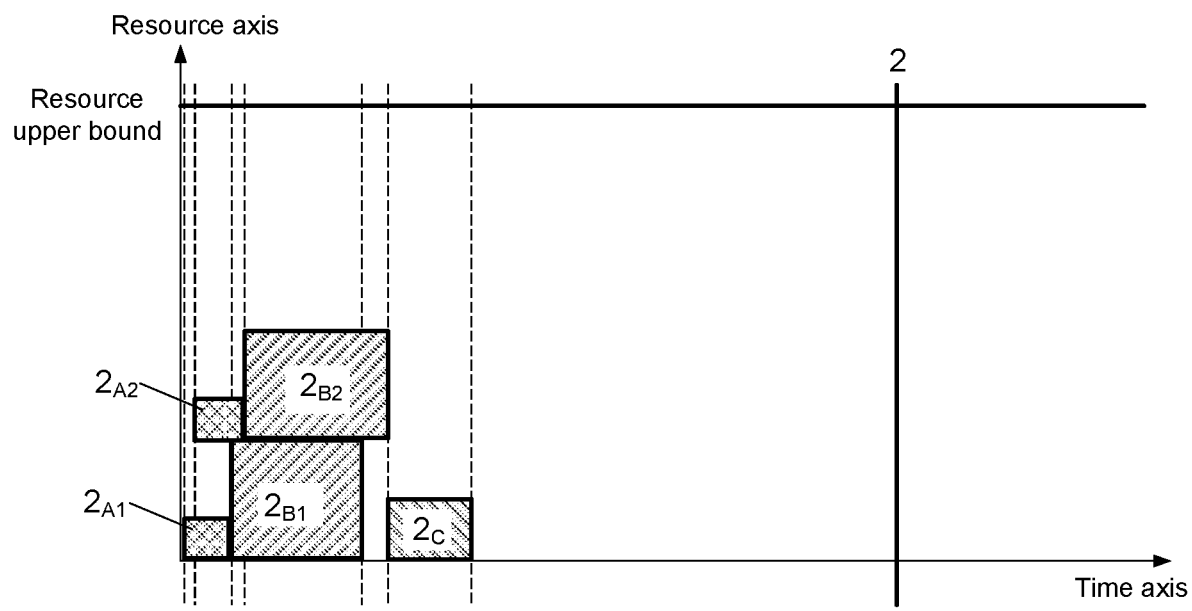
FIG. 5 is a first application diagram of a task resource scheduling method according to the fourth example embodiment provided by the present disclosure.

Here, taking B-type tasks as an explanatory example:

In FIG. 5, the horizontal axis is a time axis, and the vertical axis is a resource axis, wherein a bold black line parallel to the horizontal axis indicates a preset resource upper bound. In FIG. 5, boxes filled with cross-hatching are used to indicate A-type tasks, boxes filled with forward-slash hatching are used to indicate B-type tasks, and boxes filled with backslash hatching indicate C-type tasks. The bold vertical line parallel to the vertical axis and marked with the number 2 indicates the task deadline time of task group 2, and a dotted line parallel to the vertical axis is a time point, time points being composed of the starting times and completion times of each task among the scheduled task sequence.

When performing scheduling processing upon task group 2, for resources to be sufficient, part or all of B-type tasks among task group 2 need only be placed at corresponding positions, composing a scheduled task sequence. Herein, the starting times of each B-type task among task group 2 are the latest completion time among all depended-upon parent nodes, that is, A-type tasks, being designated as their starting times, and in task group 2, $2_{B1}$ depends upon $2_{A1}$, and $2_{B2}$ depends upon $2_{A2}$. The starting time of $2_{B1}$ is the completion time of $2_{A1}$, and the starting time of $2_{B2}$ is the completion time of $2_{A2}$. The results of the scheduled task sequence are illustrated by FIG. 5.

In FIGS. 6A to 6D the horizontal axis is the time axis, and the vertical axis is the resource axis, wherein bold black lines parallel to the horizontal axis indicate preset resource upper bounds. Boxes filled with cross-hatching are used to indicate A-type tasks, boxes filled with forward-slash hatching are used to indicate B-type tasks, and boxes filled with backslash hatching indicate C-type tasks. The bold vertical line parallel to the vertical axis and marked with the number 2 indicates the task deadline time of task group 2, and the bold vertical line parallel to the vertical axis and marked with the number 4 indicates the task deadline time of task group 4. A dotted line parallel to the vertical axis is a time point, time points being composed of the starting times and completion times of each task among the scheduled task sequence.

Figure 6A:
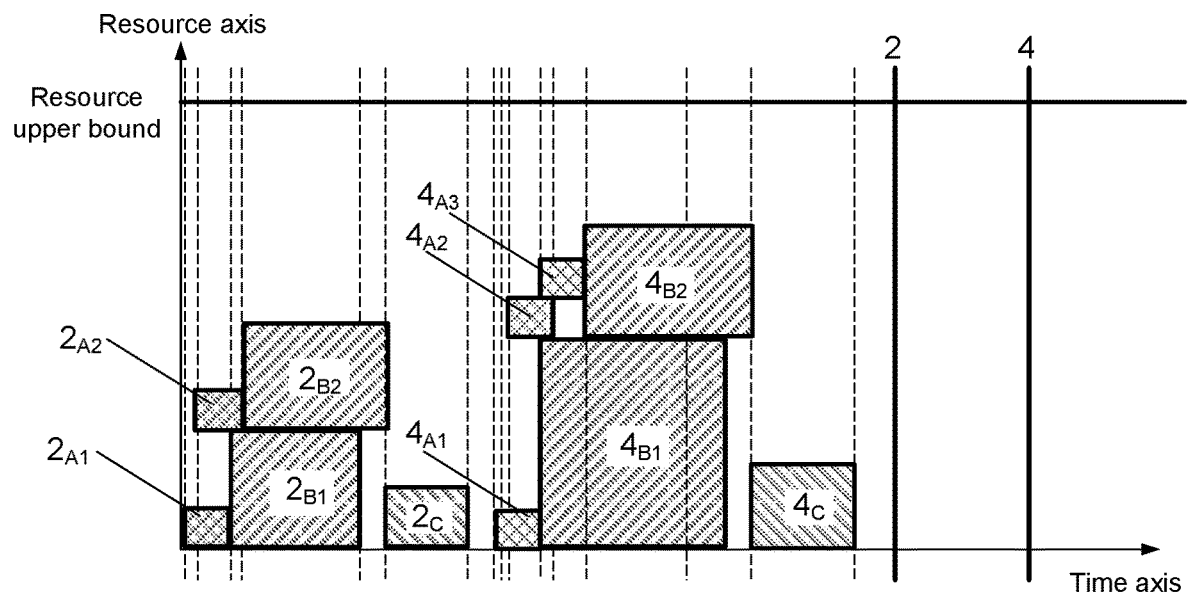
FIG. 6A is a second application diagram of a task resource scheduling method according to the fourth example embodiment provided by the present disclosure.

When performing scheduling processing upon task group 4, if B-type tasks among task group 4 and among task group 2 do not have a time resource conflict in a time series, task group 4 is placed at a corresponding position, and at this time the task sequence after B-type tasks among task group 4 have been added is saved as a scheduled task sequence, as illustrated by FIG. 6A. Herein, $4_{B1}$ depends upon $4_{A1}$, and the starting time of $4_{B1}$ is the completion time of $4_{A1}$. $4_{B2}$ depends upon $4_{A2}$ and $4_{A3}$, and $4_{B2}$ takes the latest completion time among $4_{A2}$ and $4_{A3}$ as its starting time. It may be seen from FIG. 6A that the completion time of $4_{A3}$ is latest, and $4_{B2}$ designates the completion time of $4_{A3}$ as its starting time.

To perform ordering upon B-type tasks among task group 4 in accordance with completion time, during the process of computing priority levels, the running duration of each task may be obtained, and based on starting time and running duration completion time may be calculated. According to the order, scheduling processing is successively performed upon B-type tasks. The order after ordering according to completion times is: $4_{B1}$, $4_{B2}$. First it is evaluated whether a time resource conflict exists between $4_{B1}$ and $2_{B1}$ and $2_{B2}$ among task group 2, wherein, evaluation conditions for overlapping in a time series are: the starting time of $4_{B1}$ in task group 4≤the completion time of task $2_{B1}$ or $2_{B2}$ in task group 2 and the starting time of $2_{B1}$ or $2_{B2}$ in task group 2≤the completion time of $4_{B1}$ in task group 4. As well, after $4_{B1}$ is added to the scheduled task sequence, the sum of the resources occupied by the overlapping portion in a time series is greater than the resource upper bound, that is, a time resource conflict exists between $4_{B1}$ and $2_{B1}$ and $2_{B2}$ in a time series, the time resource conflict scenario being illustrated by FIG. 6B.

Figure 6B:
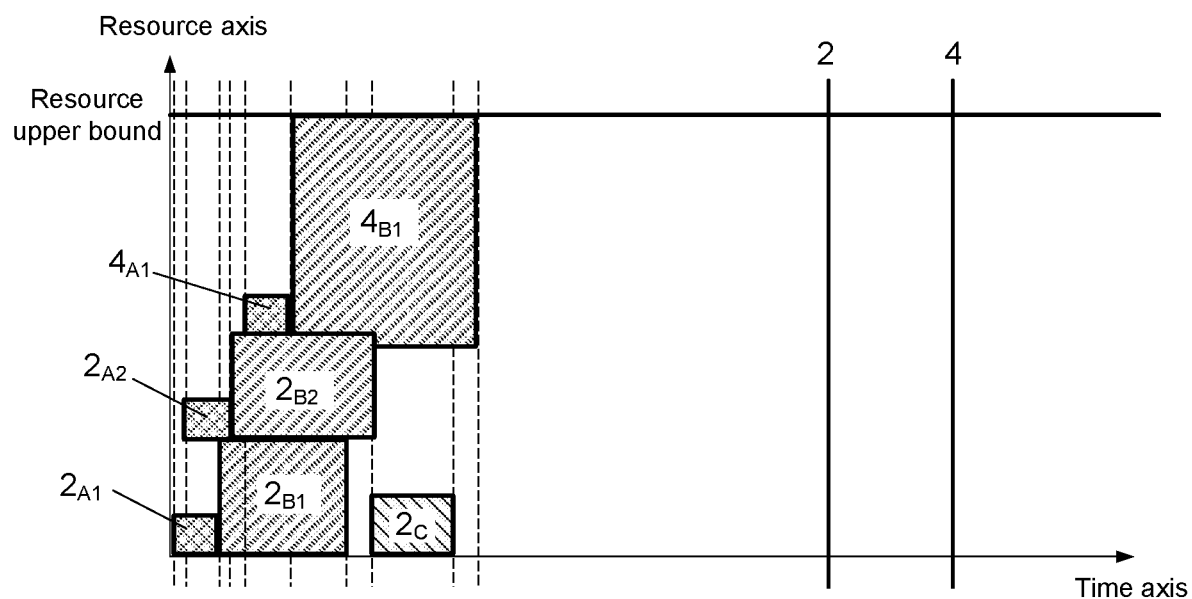
FIG. 6B is a third application diagram of a task resource scheduling method according to the fourth example embodiment provided by the present disclosure.
Figure 6C:
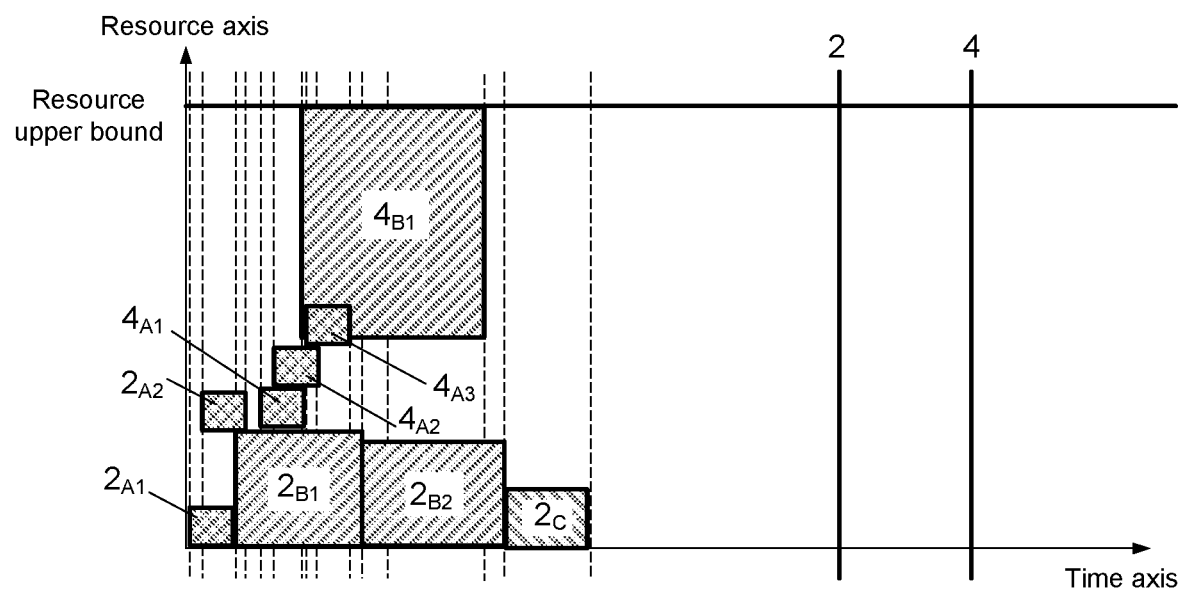
FIG. 6C is a fourth application diagram of a task resource scheduling method according to the fourth example embodiment provided by the present disclosure.

It may be seen from FIG. 6B that after $4_{B1}$ among task group 4 enters the scheduled task sequence and is queued, the portion of resources occupied by $4_{B1}$ which has a conflict in a time series with $2_{B1}$ and $2_{B2}$ among task group 2 occupies a sum of resources which exceeds the resource upper bound, so at this time, it is needed to try to delay an overlapping B-type task among task group 2, overlapping B-type tasks among task group 2 being delayed successively according to the completion times of B-type tasks from latest to earliest, and it may be derived from FIG. 6B that the completion time of $2_{B2}$ is later than $2_{B1}$, so first $2_{B2}$ is moved rearward, freeing certain resources for $4_{B1}$. During the process of moving $2_{B2}$, delaying is performed according to time points, that is, delaying is performed according to the illustrated dotted lines, and when $2_{B2}$ is later than the completion time of $2_{B1}$, a sum of resources occupied by $4_{B1}$ and resources occupied by $2_{B1}$ and $2_{B2}$ among task group 2 having a conflict therewith in a time series does not exceed the resource upper bound, as illustrated by FIG. 6C.

After delaying, it is needed to evaluate whether the completion time of $2_{B1}$ among task group 2 exceeds the task deadline time set for task group 2, and if not in excess then $4_{B1}$ is added to the task sequence, and the task sequence having $4_{B1}$ added is saved as the scheduled task sequence.

Figure 6D:
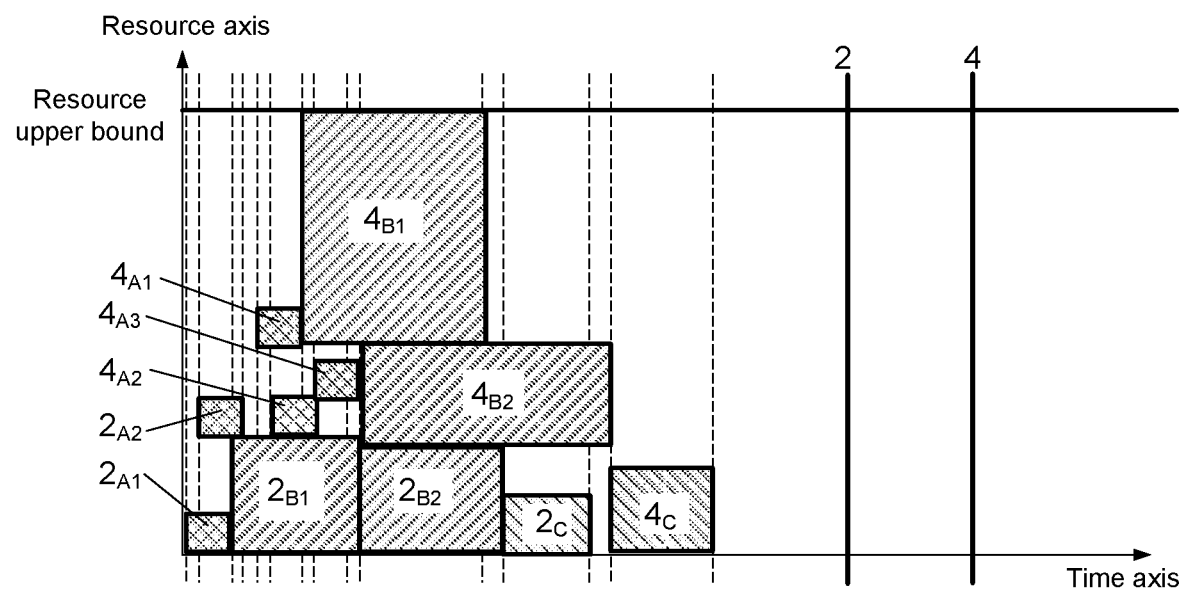
FIG. 6D is a fifth application diagram of a task resource scheduling method according to the fourth example embodiment provided by the present disclosure.

Furthermore, scheduling processing continues for $4_{B2}$ among task group 4 according to the above-mentioned steps, first respectively evaluating whether $4_{B2}$ with $2_{B1}$ and $2_{B2}$ among task group 2 as well as $4_{B1}$ have overlaps in a time series, wherein, the evaluation conditions of overlaps in a time series shall not be reiterated. Upon evaluating that $4_{B1}$ and the previously queued B-type tasks have an overlap in a time series, after adding $4_{B2}$ to the scheduled task sequence, and evaluating that the resources occupied by the overlapping portion in a time series do not exceed the resource upper bound, $4_{B2}$ is added to the task sequence, and the task having $4_{B2}$ added is saved as the scheduled task sequence, as illustrated by FIG. 6D.

In FIGS. 7A to 7D the horizontal axis is a time axis, and the vertical axis is a resource axis, wherein a bold black line parallel to the horizontal axis indicates a preset resource upper bound. Boxes filled with cross-hatching are used to indicate A-type tasks, boxes filled with forward-slash hatching are used to indicate B-type tasks, and boxes filled with backslash hatching indicate C-type tasks. The bold vertical line parallel to the vertical axis and marked with the number 2 indicates the task deadline time of task group 2, the bold vertical line parallel to the vertical axis and marked with the number 4 indicates the task deadline time of task group 4, and the bold vertical line parallel to the vertical axis and marked with the number 1 indicates the task deadline time of task group 1. A dotted line parallel to the vertical axis is a time point, time points being composed of the starting times and completion times of each task among the scheduled task sequence. Here it should be stated that FIGS. 7A to 7D are scheduling operations upon the basis of FIG. 6D.

Figure 7A:
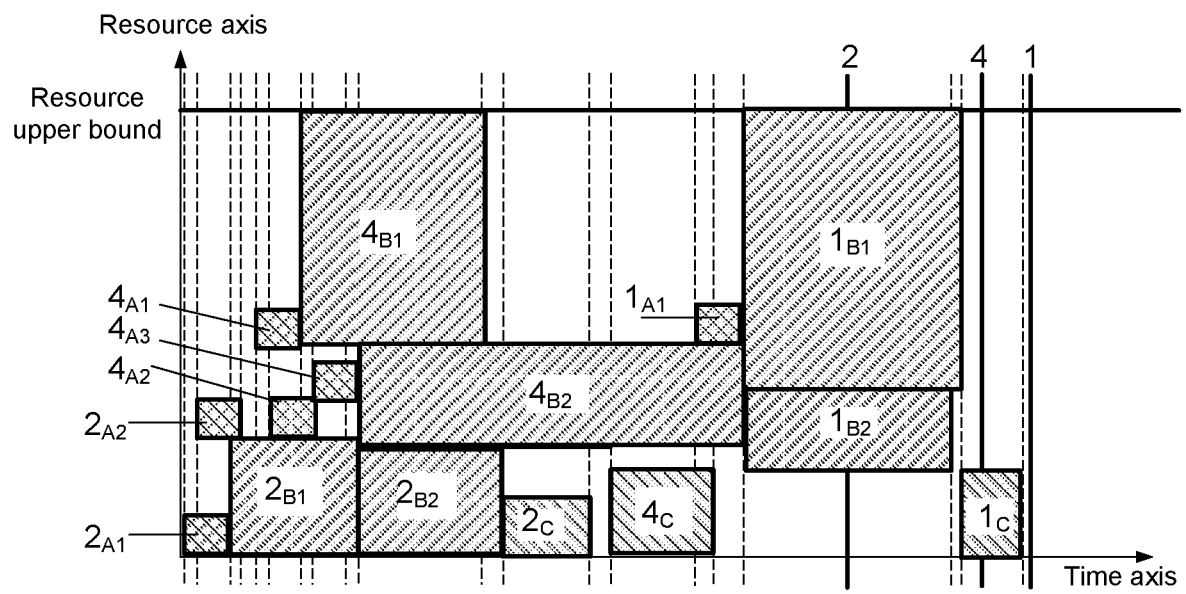
FIG. 7A is a sixth application diagram of a task resource scheduling method according to the fourth example embodiment provided by the present disclosure.

When performing scheduling processing upon task group 1, if $1_{B1}$ and $1_{B2}$ among the tasks of task group 1 do not have a conflict in a time series with B-type tasks in the scheduled task sequence, the tasks among task group 1 are added to the scheduled task sequence, as illustrated by FIG. 7A. Herein, $1_{B1}$ and $1_{B2}$ depends upon $1_{A1}$, the starting times of $1_{B1}$ and $1_{B2}$ being the completion time of $1_{A1}$.

If $1_{B1}$ and $1_{B2}$ among task group 1 have a time resource conflict in a time series with B-type tasks among the scheduled task sequence, a scheduling operation needs to be performed. The starting times of $1_{B1}$ and $1_{B2}$ among task group 1 are the same, so $1_{B1}$ may be selected to enter the scheduled task ordering and be queued, $1_{B1}$ having a time resource conflict with $4_{B2}$ among task group 4, as illustrated by FIG. 7B.

Figure 7B:
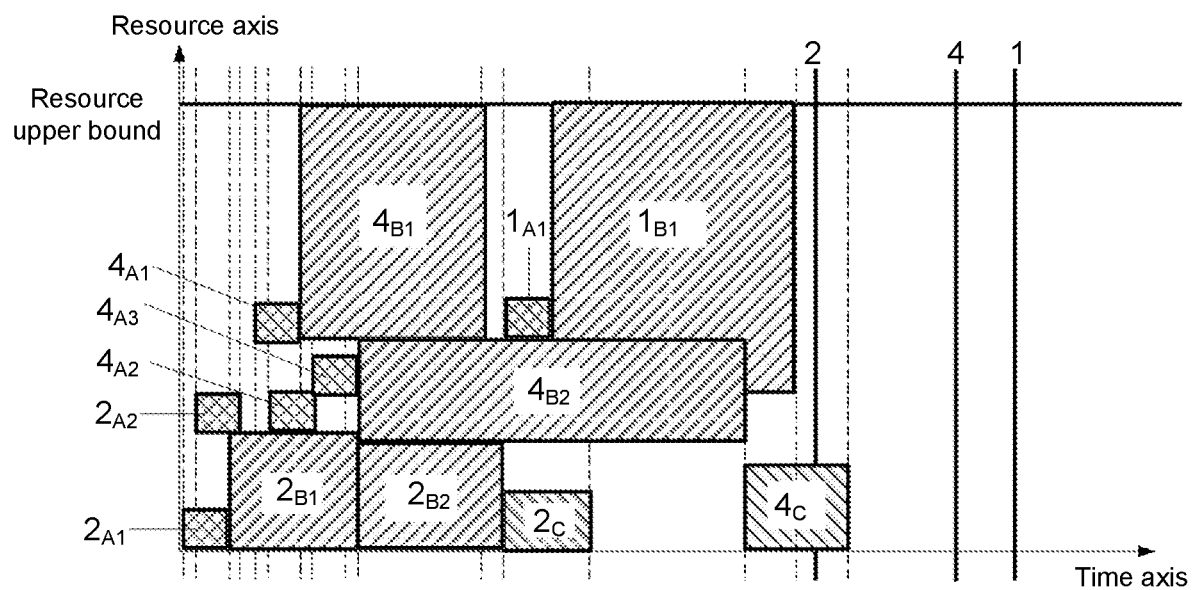
FIG. 7B is a seventh application diagram of a task resource scheduling method according to the fourth example embodiment provided by the present disclosure.
Figure 7C:
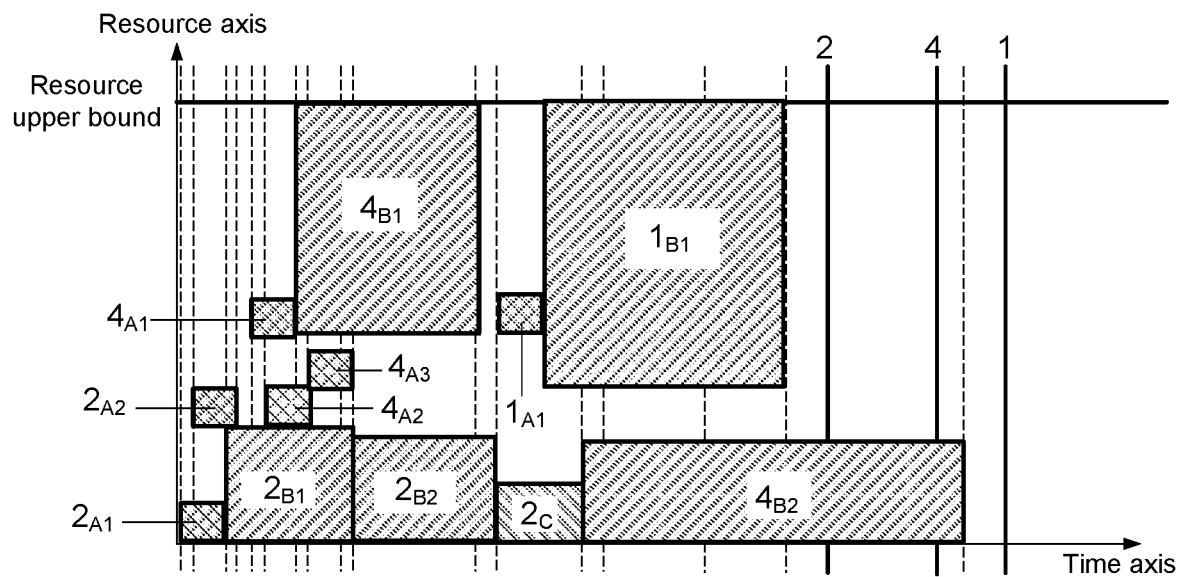
FIG. 7C is an eighth application diagram of a task resource scheduling method according to the fourth example embodiment provided by the present disclosure.

It may be seen from FIG. 7B that the sum of the resources occupied in the section in time where $1_{B1}$ with $4_{B1}$ overlap exceeds the resource upper bound, so at this time, it is needed to try to move $4_{B2}$ among task group 4 rearward along a time series, freeing certain resources for $1_{B1}$. During the process of moving $4_{B2}$ rearward, delaying is performed according to each time point, that is, delaying is performed according to the dotted lines, and when $4_{B2}$ is delayed to the completion time of $2_C$, a sum of the resources occupied by $1_{B1}$ and the resources occupied by $4_{B2}$ in an overlapping portion in a time series does not exceed the resource upper bound, but, since the completion time of $4_{B2}$ is correspondingly delayed, this causes the completion time of $4_{B2}$ to exceed the task deadline time set for task group 4 for B-type tasks, that is, exceeding the bold vertical line marked with the number 4, as illustrated by FIG. 7C. Now, $1_{B1}$ among task group 1 cannot be added to the scheduled task sequence and be queued, and now adding $1_{B1}$ to the scheduled task sequence is abandoned.

Figure 7D:
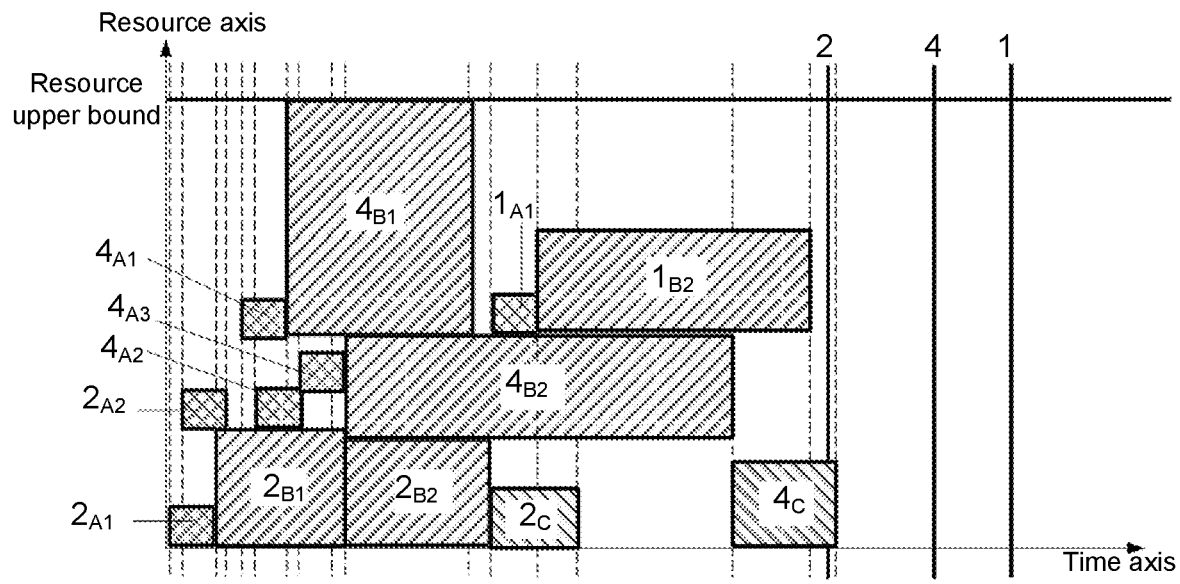
FIG. 7D is a ninth application diagram of a task resource scheduling method according to the fourth example embodiment provided by the present disclosure.

Furthermore, resource deployment continues for $1_{B2}$ among task group 1 according to the above-mentioned steps, where since $1_{B1}$ and $1_{B2}$ of task group 1 have the same starting time, $1_{B2}$ also has an overlap in a time series with $4_{B2}$ among task group 4, but since the sum of resources occupied in a section on a time series where $1_{B2}$ with $4_{B2}$ overlap does not exceed the resource upper bound, as illustrated by FIG. 7D, $1_{B2}$ may be added to the scheduled task sequence and queued. Since $1_{B1}$ has not been placed in the scheduled task sequence, $1_C$, having a dependent relationship thereto, also cannot be queued.

In FIGS. 8A to 8D the horizontal axis is a time axis, and the vertical axis is a resource axis, wherein a bold black line parallel to the horizontal axis indicates a preset resource upper bound. Boxes filled with cross-hatching are used to indicate A-type tasks, boxes filled with forward-slash hatching are used to indicate B-type tasks, and boxes filled with backslash hatching indicate C-type tasks. The bold vertical line parallel to the vertical axis and marked with the number 2 indicates the task deadline time of task group 2, the bold vertical line parallel to the vertical axis and marked with the number 4 indicates the task deadline time of task group 4, the bold vertical line parallel to the vertical axis and marked with the number 1 indicates the task deadline time of task group 1, and the bold vertical line parallel to the vertical axis and marked with the number 3 indicates the task deadline time of task group 3. Time points are composed of the starting times and completion times of each task among the scheduled task sequence. Here it should be stated that FIGS. 8A to 8D are scheduling operations upon the basis of FIG. 7D.

Figure 8A:
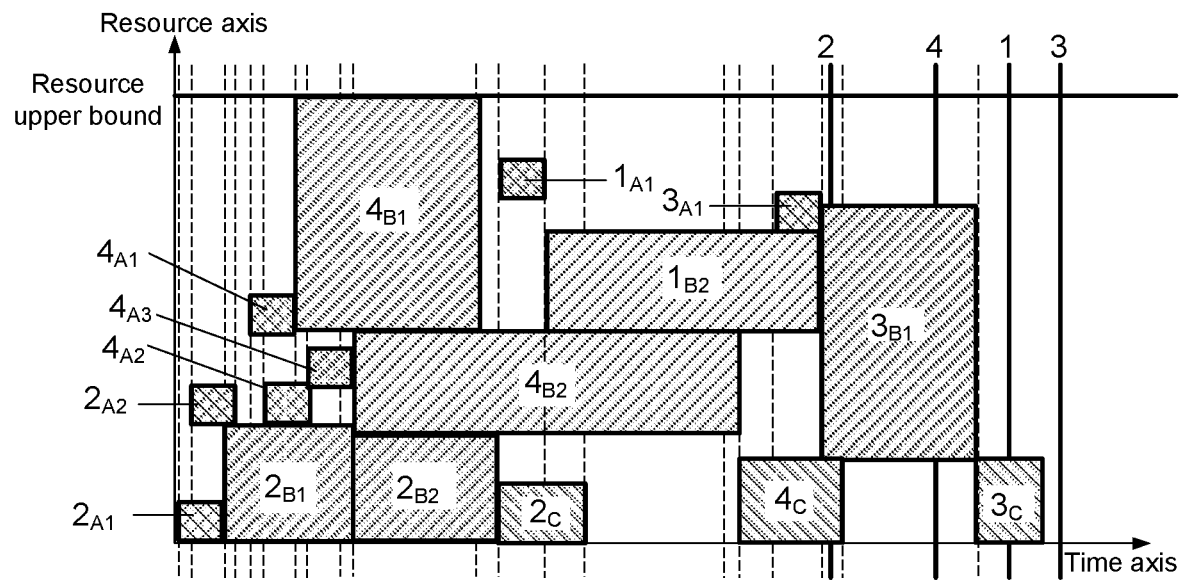
FIG. 8A is a tenth application diagram of a task resource scheduling method according to the fourth example embodiment provided by the present disclosure.

When performing scheduling processing upon task group 3, if tasks among task group 3 do not have overlaps in a time series with tasks of a same type in the scheduled task sequence, the tasks of task group 3 may be added to the scheduled task sequence and queued, as illustrated by FIG. 8A. Herein, $3_{B1}$ depends upon $3_{A1}$, the starting time of $3_{B1}$ being the completion time of $3_{A1}$.

If $3_{B1}$ among task group 3 has a conflict in a time series with B-type tasks among the scheduled task sequence, a scheduling operation needs to be performed. The starting time of $3_{B1}$ among task group 3 is the completion time of $3_{A1}$, and $3_{B1}$ has a time resource conflict with both $4_{B2}$ among task group 4 as well as $1_{B2}$ among task group 1, as illustrated by FIG. 8B.

Figure 8B:
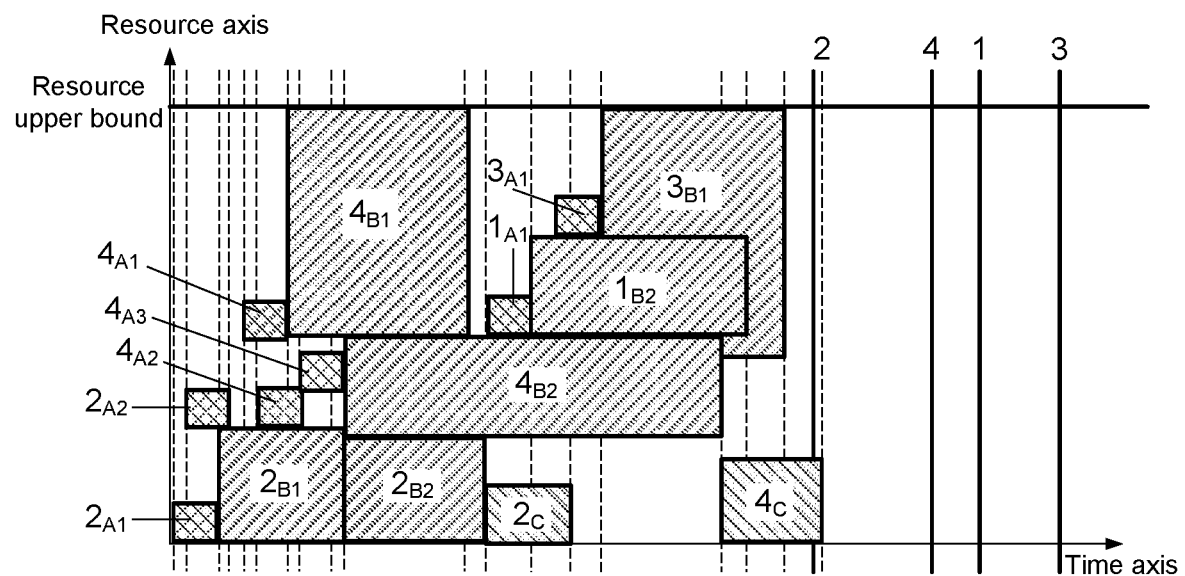
FIG. 8B is an eleventh application diagram of a task resource scheduling method according to the fourth example embodiment provided by the present disclosure.
Figure 8C:
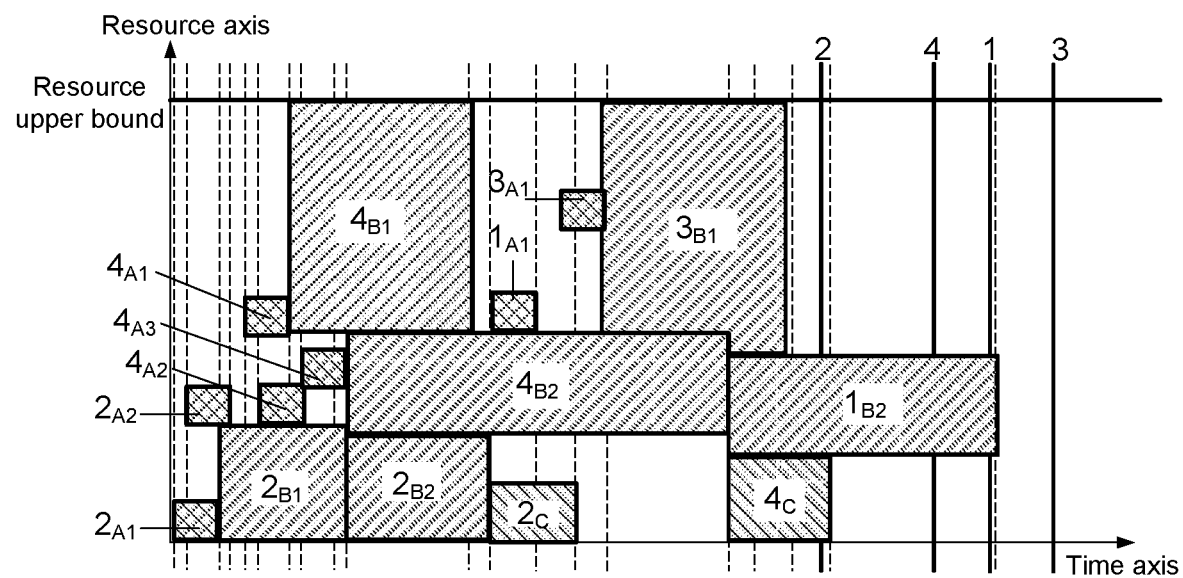
FIG. 8C is a twelfth application diagram of a task resource scheduling method according to the fourth example embodiment provided by the present disclosure.

It may be seen from FIG. 8B that the sum of the resources occupied by $3_{B1}$ and the resources occupied by $4_{B2}$ as well as $1_{B2}$ which has a conflict in a section of a time series with $3_{B1}$ exceeds the resource upper bound. The conflicting $4_{B2}$ and $1_{B2}$ are ordered by completion time from latest to earliest, and first $1_{B2}$ is moved rearward along a time series, freeing certain resources for $3_{B1}$. During the process of moving $1_{B2}$ rearward, moving is performed according to time points, that is, moving is performed according to the dotted lines, and when $1_{B2}$ is moved to the completion time of $4_{B2}$, the completion time of $1_{B2}$ exceeds the deadline time of task group 1, and now the sum of the resources occupied by the resources occupied by $3_{B1}$ with $1_{B2}$ in a section of a time series having overlaps still exceeds the resource upper bound, as illustrated by FIG. 8C.

Figure 8D:
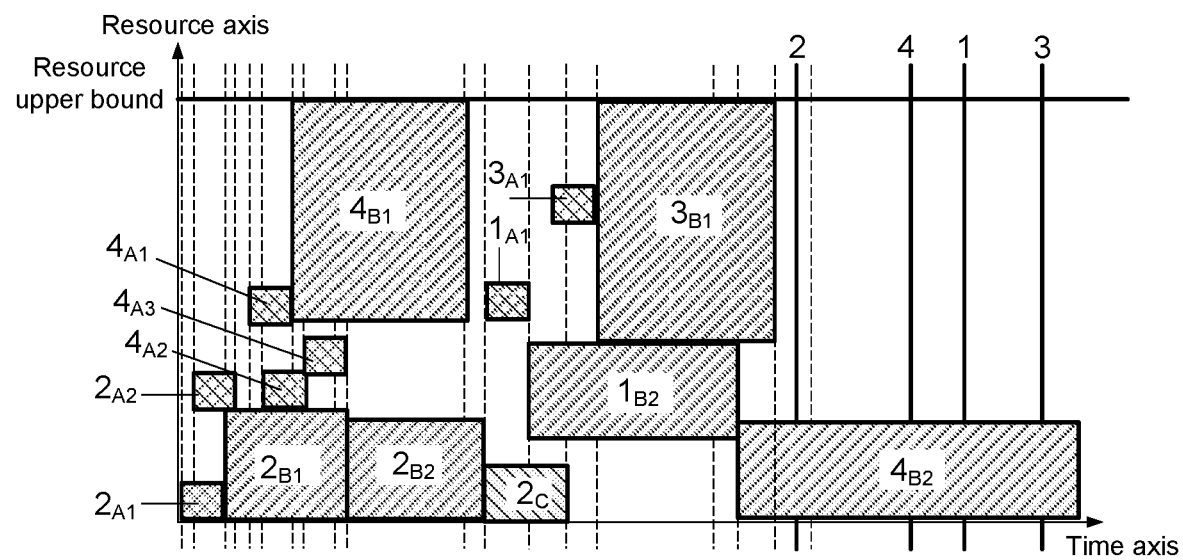
FIG. 8D is a thirteenth application diagram of a task resource scheduling method according to the fourth example embodiment provided by the present disclosure.

Now, it is needed to try to move $4_{B2}$ rearward along a time series, freeing certain resources for $3_{B1}$. During the process of moving $4_{B2}$ rearward, moving rearward is performed according to time points, that is, moving rearward is performed according to the dotted lines, and when $4_{B2}$ is moved to the completion time of $1_{B2}$, now the sum of the resources occupied by $3_{B1}$ and the resources occupied by $4_{B2}$ as well as $1_{B2}$ in a section of a time series having overlaps with $3_{B1}$ does not exceed the resource upper bound, as illustrated by FIG. 8D. From the Figure it may be derived that now the completion time of FIG. $4_{B2}$ exceeds the task deadline time of task group 4, and thus, $3_{B1}$ cannot be added to the scheduled task sequence and queued, and scheduling of $3_{B1}$ is abandoned.

After completing task resource scheduling for all task groups, resources still cannot be deployed for $1_{B1}$ among task group 1 and $3_{B1}$ among task group 3. Now, $1_{B1}$ and $3_{B1}$ undergo resource scheduling as second tasks awaiting scheduling. Here it should be stated that resource scheduling for the second tasks awaiting scheduling is performed upon the results of FIG. 7D.

Figure 9A:
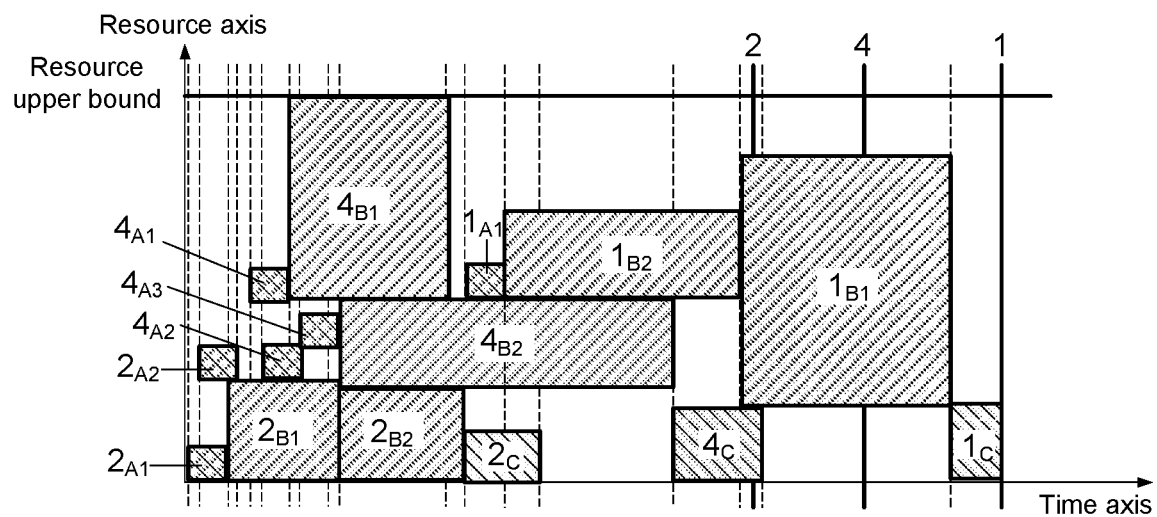
FIG. 9A is a fourteenth application diagram of a task resource scheduling method according to the fourth example embodiment provided by the present disclosure.
Figure 9B:
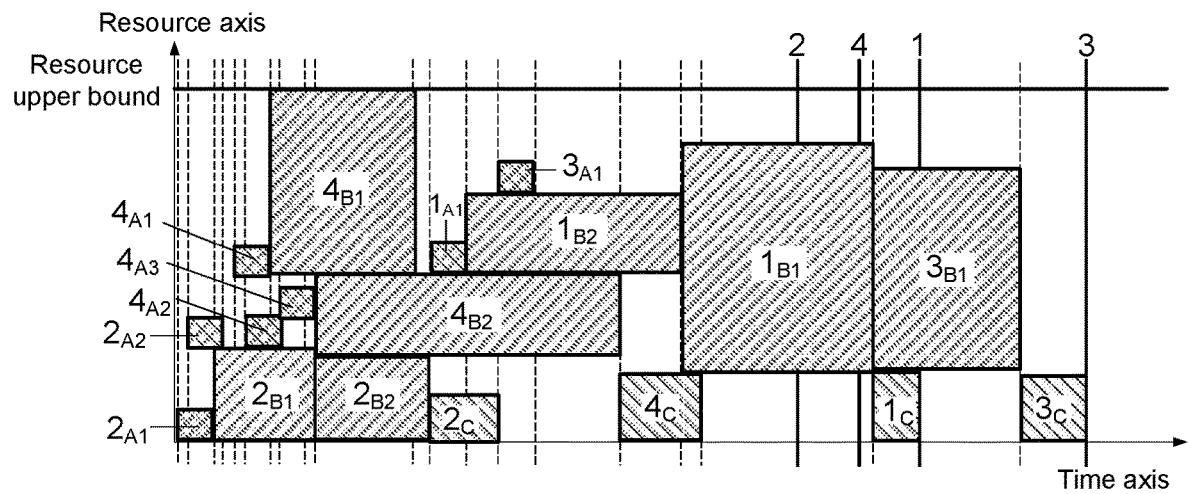
FIG. 9B is a fifteenth application diagram of a task resource scheduling method according to the fourth example embodiment provided by the present disclosure.

In FIGS. 9A to 9B the horizontal axis is a time axis, and the vertical axis is a resource axis, wherein a bold black line parallel to the horizontal axis indicates a preset resource upper bound. Boxes filled with cross-hatching are used to indicate A-type tasks, boxes filled with forward-slash hatching are used to indicate B-type tasks, and boxes filled with backslash hatching indicate C-type tasks. The bold vertical line parallel to the vertical axis and marked with the number 2 indicates the task deadline time of task group 2, the bold vertical line parallel to the vertical axis and marked with the number 4 indicates the task deadline time of task group 4, the bold vertical line parallel to the vertical axis and marked with the number 1 indicates the task deadline time of task group 1, and the bold vertical line parallel to the vertical axis and marked with the number 3 indicates the task deadline time of task group 3. Time points are composed of the starting times and completion times of each task among the scheduled task sequence.

It is attempted to add $1_{B1}$ among task group 1 to the scheduled task sequence starting from the last time point along the time series, and when $1_{B1}$ is placed at the dotted line of the completion time of $4_C$ and does not exceed the resource upper bound, $1_{B1}$ continues to move frontward, and when it is moved to the dotted line of the completion time of $1_{B2}$, and not exceeding the resource upper bound, it may continue to move frontward, and when it is moved to the dotted line of the completion time of $4_{B2}$, exceeding the resource upper bound, the earliest starting time of $1_{B1}$ is the completion time of $1_{B2}$. Correspondingly, the completion time of $1_C$ is delayed, since the completion time of $1_C$ after delaying exceeds the deadline time, the deadline time of task group 1 needs to be adjusted, with the completion time of $1_C$ being designated as the ultimate deadline time of task group 1, as illustrated by FIG. 9A.

Furthermore, upon the basis of FIG. 9A, it is attempted to add $3_{B1}$ among task group 3 to the scheduled task sequence starting from the last time point along the time series, and when $3_{B1}$ is placed at the dotted line of the completion time of $1_C$ and does not exceed the resource upper bound, $3_{B1}$ continues to move frontward, and when it is moved to the dotted line of the completion time of $1_{B2}$, and does not exceed the resource upper bound, it may continue to move frontward, and when it is moved to the dotted line of the completion time of $4_C$, and exceeds the resource upper bound, the earliest starting time of $3_{B1}$ is the completion time of $1_{B2}$. Correspondingly, the completion time of $3_C$ is delayed, since the completion time of $3_C$ after delaying exceeds the deadline time, the ultimate deadline time of task group 3 is adjusted to the completion time of $3_C$, as illustrated by FIG. 9B.

According to the example, when resource scheduling for a first task awaiting scheduling is unsuccessful, scheduling of the first task awaiting scheduling is abandoned, waiting until after scheduling of all the of the same type awaiting scheduling has been completed, and then it is attempted to perform resource scheduling upon an abandoned first task awaiting scheduling from rear to front in a time series, in order for the completion times of task groups to be as close to their set deadline times as much as possible, so that completion times may not be too much later than their deadline times.

Fifth Example Embodiment

Figure 10:
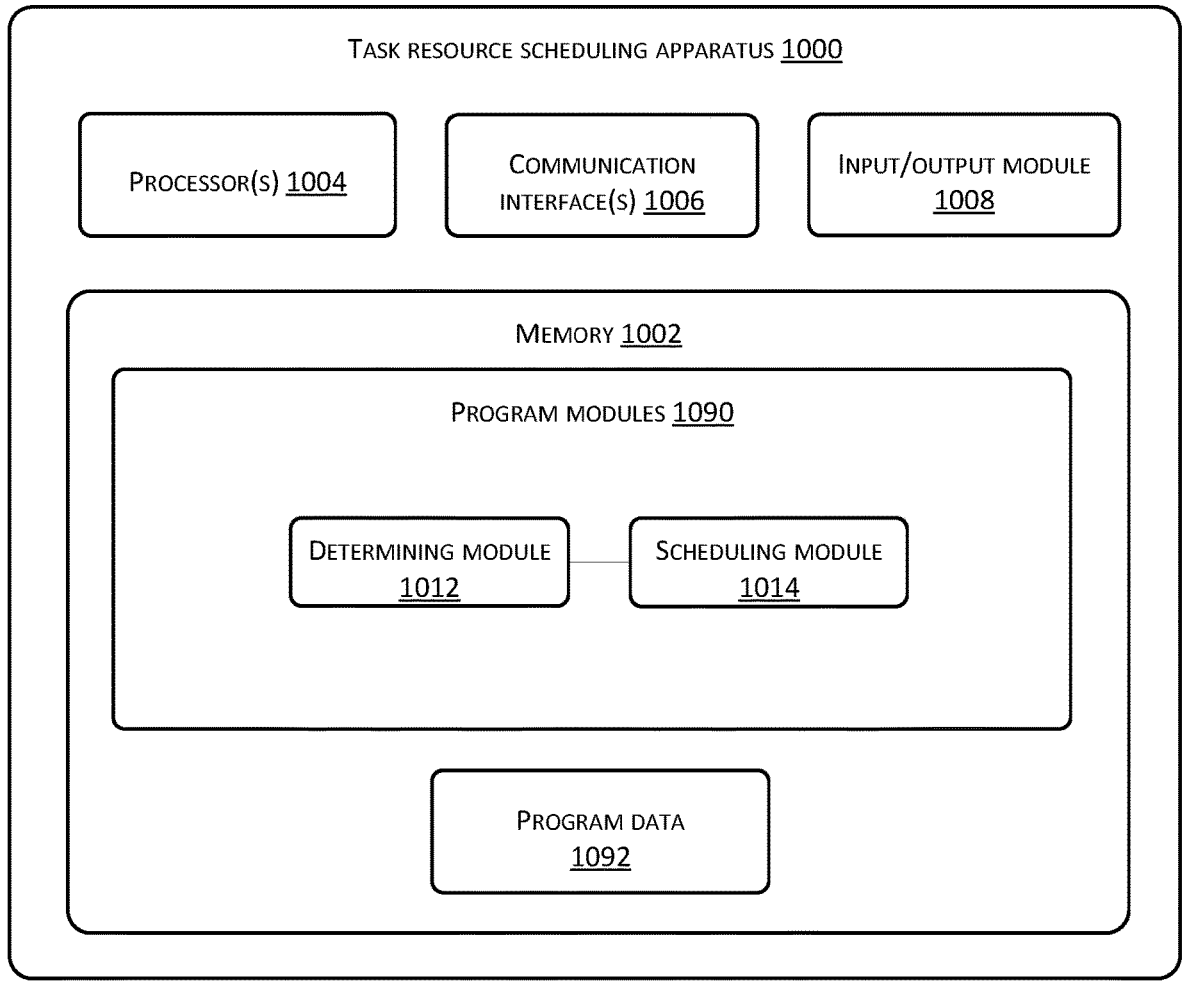
FIG. 10 is a diagram of a task resource scheduling apparatus according to a fifth example embodiment provided by the present disclosure.

FIG. 10 is a diagram of a task resource scheduling apparatus 1000 according to a fifth example embodiment of the present disclosure. As illustrated by FIG. 10, the task resource scheduling apparatus 1000 may include: memory 1002, one or more processors 1004, one or more communication interfaces 1006, and an input/output module 1008. The task resource scheduling apparatus may further include: a determining module 1012 and a scheduling module 1014.

Memory 1002 is operative to store program instructions and/or data.

One or more processors 1004, through reading program instructions and/or data stored on memory 1002, are operative to execute processes as follows:

The determining module 1012 is stored in the memory 1002 and executable by the one or more processors 1004 to cause the one or more processors 1004 to determine priority levels of multiple tasks, set task deadline times, and preset resource upper bounds.

According to the present example embodiment, each task corresponds to a priority level, and different tasks may have the same priority level. Different tasks may belong to a same request, priority levels of tasks among different requests may be different, and priority levels of all the tasks of the same request are the same. Furthermore, a task deadline time is set up for each request, and tasks included in the request need to be completed within the task deadline time.

To ensure that a computing cluster executing tasks may operate efficiently, a resource upper bound needs to be set up for the computing cluster executing tasks, where the operational efficiency of the computing cluster is comparatively high within the resource upper bound, and when the resource upper bound is exceeded, abnormalities may appear during the process of executing tasks.

The scheduling module 1014 is stored in the memory 1002 and executable by the one or more processors 1004 to cause the one or more processors 1004 to, based on task priority levels, schedule the successive order of executing multiple tasks, the post-scheduling tasks satisfying a first condition.

Herein, the first condition is that a time resource conflict does not exist for the tasks, a time resource conflict being that a section exists on a time series where more than one task overlaps, and the sum of the resources occupied in the section having the overlap is greater than the resource upper bound. A time resource conflict, in particular, is that a section exists on a time series where more than one task of a same type overlap, and the sum of the resources occupied in the section having the overlap is greater than the resource upper bound.

Furthermore, post-scheduling tasks also satisfy a second condition: the completion times of all the tasks do not exceed their set task deadline times. This is to say, all post-scheduling tasks need to be completed within a set task deadline time.

The scheduling module 1014 is further executable by the one or more processors 1004 to cause the one or more processors 1004 to, if tasks exist that cannot satisfy the first condition and the second condition, place the tasks for processing after scheduling is completed for the other tasks.

The scheduling module 1014 is further executable by the one or more processors 1004 to cause the one or more processors 1004 to, based on priority levels of tasks and dependent relationships of tasks, schedule the successive order of executing multiple tasks.

To ensure that important tasks may be executed first as much as possible, the scheduling module 1014 needs to order multiple tasks according to the determined priority levels of tasks, where in particular, tasks of different types exist among the multiple tasks, dependent relationships may exist between tasks of different types among the multiple tasks, in normal scenarios, dependent relationships exist between tasks of different types of a same request, and the successive order of executing multiple tasks is scheduled based on the priority levels of tasks and dependent relationships of tasks. According to the present example embodiment, tasks of different requests are scheduled according to the order of priority levels, and tasks of one request need to be scheduled based on dependent relationships between tasks.

Furthermore, if tasks exist that cannot satisfy the first condition and the second condition, the tasks are placed for processing after scheduling is completed for the other tasks.

In implementations, the memory 1002 may include program modules 1090 and program data 1092. The program modules 1090 may include one or more of the modules as described above.

When multiple tasks are executed according to the present example embodiment, the existing first-come, first-compute rule is no longer utilized, but rather scheduling is performed based on the priority levels of tasks; through the above-mentioned scheduling method, each task may be maintained as executed ordered by level, ensuring as much as possible that tasks corresponding to high-level requests preferentially obtain resources, and thereby may be preferentially executed, which is advantageous for the requests to present data at a frontend.

Sixth Example Embodiment

Figure 11:
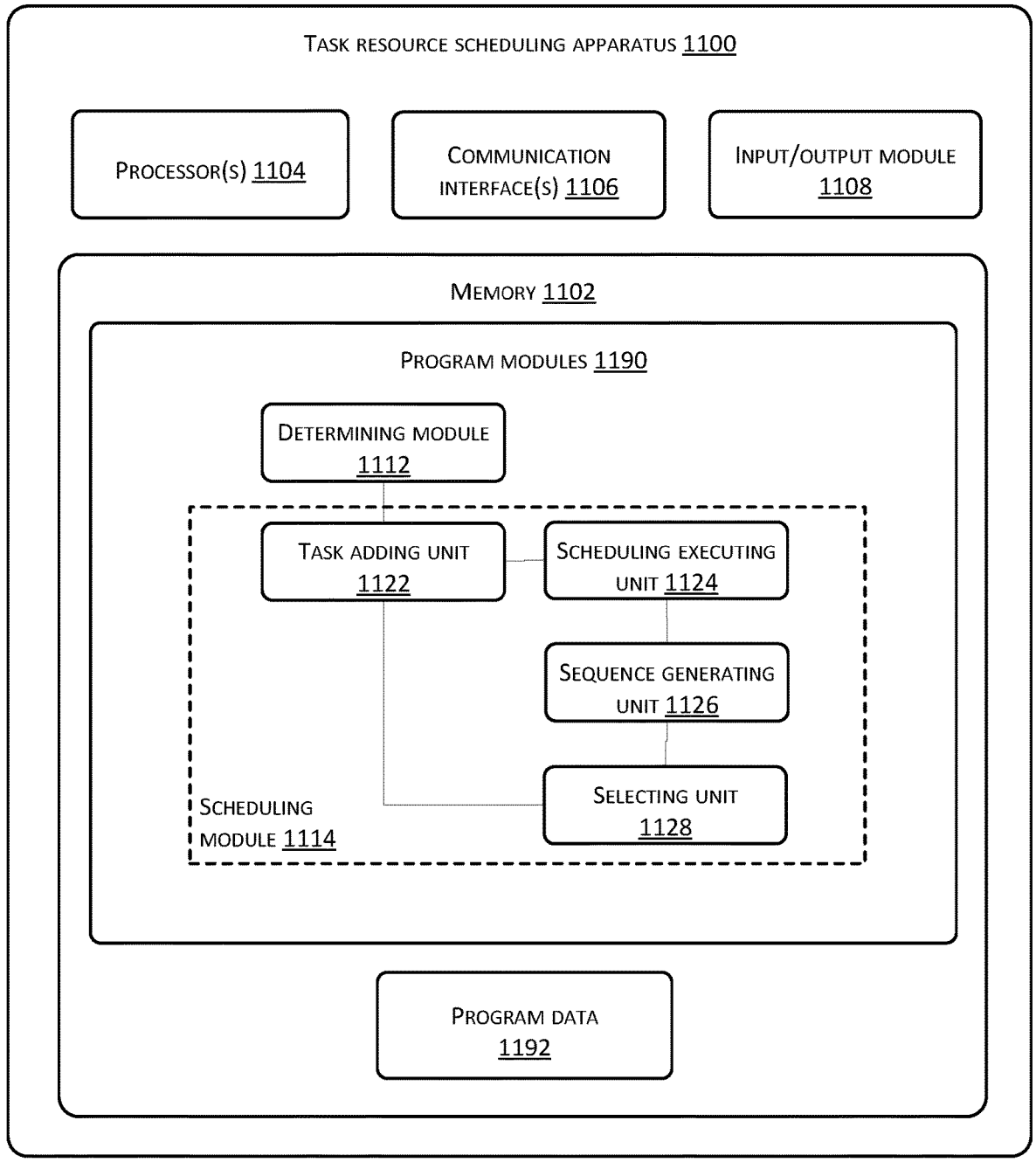
FIG. 11 is a diagram of a task resource scheduling apparatus according to a sixth example embodiment provided by the present disclosure.

FIG. 11 is a diagram of a task resource scheduling apparatus 1100 according to a sixth example embodiment of the present disclosure. As illustrated by FIG. 11, the task resource scheduling apparatus 1100 may include: memory 1102, one or more processors 1104, one or more communication interfaces 1106, and an input/output module 1108. The task resource scheduling apparatus may further include: a determining module 1112 and a scheduling module 1114.

According to the present example embodiment, a scheduled task sequence is composed from scheduled tasks.

Memory 1102 is operative to store program instructions and/or data.

One or more processors 1104, through reading program instructions and/or data stored on memory 1102, are operative to execute processes as follows:

An optional configuration of the scheduling module 1112 includes:

A task adding unit 1122, a scheduling executing unit 1124, a sequence generating unit 1126 and a selecting unit 1128.

Herein, the task adding unit 1122 is stored in the memory 1102 and executable by the one or more processors 1104 to cause the one or more processors 1104 to add a first task awaiting scheduling to the scheduled task sequence, the priority levels of the tasks among the scheduled task sequence being higher than or equal to the priority level of the first task awaiting scheduling, the scheduled task sequence satisfying a first condition.

The scheduling executing unit 1124 is stored in the memory 1102 and executable by the one or more processors 1104 to cause the one or more processors 1104 to, if adding the first task awaiting scheduling results in a time resource conflict, execute a first scheduling operation as follows:

Adjust rearward along the time series one or more first overlapping tasks which, with the first task awaiting scheduling, produce a time resource conflict, or, adjust rearward along the time series one or more first overlapping tasks as well as all or some tasks of the same type as the first task awaiting scheduling on the subsequent time series, and generate a post-adjustment task sequence satisfying the first condition and a second condition.

Herein, the second condition is: the completion times of all the tasks do not exceed their set task deadline times.

The sequence generating unit 1126 is stored in the memory 1102 and executable by the one or more processors 1104 to cause the one or more processors 1104 to, if a post-scheduling task sequence satisfying the first condition and the second condition exists, save it as a scheduled task sequence, and if it does not exist, abandon adding the first task awaiting scheduling to the scheduled task sequence.

The selecting unit 1128 is stored in the memory 1102 and executable by the one or more processors 1104 to cause the one or more processors 1104 to select a new unscheduled task designated as a first task awaiting scheduling, and execute again the process of adding the first task awaiting scheduling to the scheduled task sequence, until all the unscheduled tasks have finished processing.

Furthermore, the sequence generating unit 1126 is further executable by the one or more processors 1104 to, if adding the first task awaiting scheduling does not result in a time resource conflict, save the task sequence having the first task awaiting scheduling added as the scheduled task sequence.

Furthermore, the selecting unit 1128 is further executable by the one or more processors 1104 to, after all the unscheduled tasks have finished processing, select an abandoned first task awaiting scheduling designated as a second task awaiting scheduling, and carry out a below second scheduling operation:

Starting the second task awaiting scheduling at a tail end of the scheduled task sequence, move frontward along the time series, and select the foremost position satisfying a below third condition designated as an ultimate position of the second task awaiting scheduling, the third condition being that a time resource conflict does not exist for the task sequence after adding the second task awaiting scheduling.

Furthermore, while adjusting rearward along the time series one or more first overlapping tasks as well as all or some tasks of the same type as the first task awaiting scheduling on the subsequent time series, maintain the successive order of tasks of the same type among the scheduled task sequence.

Furthermore, the scheduling executing unit 1124 is executable by the one or more processors 1104 to move the one or more first overlapping tasks designated as a target task(s) rearward along the time series until the time resource conflict(s) produced by the target task(s) disappear(s), then stop, and if the completion time(s) of the target task(s) post-moving do not exceed their set task deadline times, then further evaluate whether, post-moving, a second overlapping task exists which produces a time resource conflict with the target task(s), and if one exists, designate the one or more second overlapping tasks as the new target task(s) and execute the above-mentioned operation of moving the target task(s) rearward along the time series again, and if one does not exist, designate the current task sequence saved as the scheduled task sequence, and if the completion time(s) of the target task(s) post-moving exceed their set task deadline time(s), decide that a post-scheduling task sequence satisfying the first condition does not exist, and abandon the operation of adding the first task awaiting scheduling to the scheduled task order.

Furthermore, a time series includes time points composed of the starting times and completion times of each task contained in the scheduled task sequence, and when adjusting tasks along the time series, in particular tasks are adjusted along the time points of the time series.

In implementations, the memory 1102 may include program modules 1190 and program data 1192. The program modules 1190 may include one or more of the modules as described above.

A task resource scheduling apparatus provided by the present example embodiment adds a first task awaiting scheduling to a scheduled task sequence, wherein, the priority level of the first task awaiting scheduling is lower than or equal to the priority levels of the tasks among the scheduled task sequence, and when adding the first task awaiting scheduling results in a time resource conflict, a first scheduling operation is performed upon the first task awaiting scheduling, and the scheduled task sequence is adjusted, to arrive at the goals of a post-adjustment task sequence not having a time resource conflict, and of the completion times of all the tasks among the scheduled task sequence not exceeding their set task deadline times.

Through the above-mentioned scheduling processing, each task may be maintained as executed by level order, ensuring as much as possible that tasks corresponding to high-level requests preferentially obtain resources, and thereby may be preferentially executed, which is advantageous for the requests to present data at a frontend.

Seventh Example Embodiment

Figure 12:
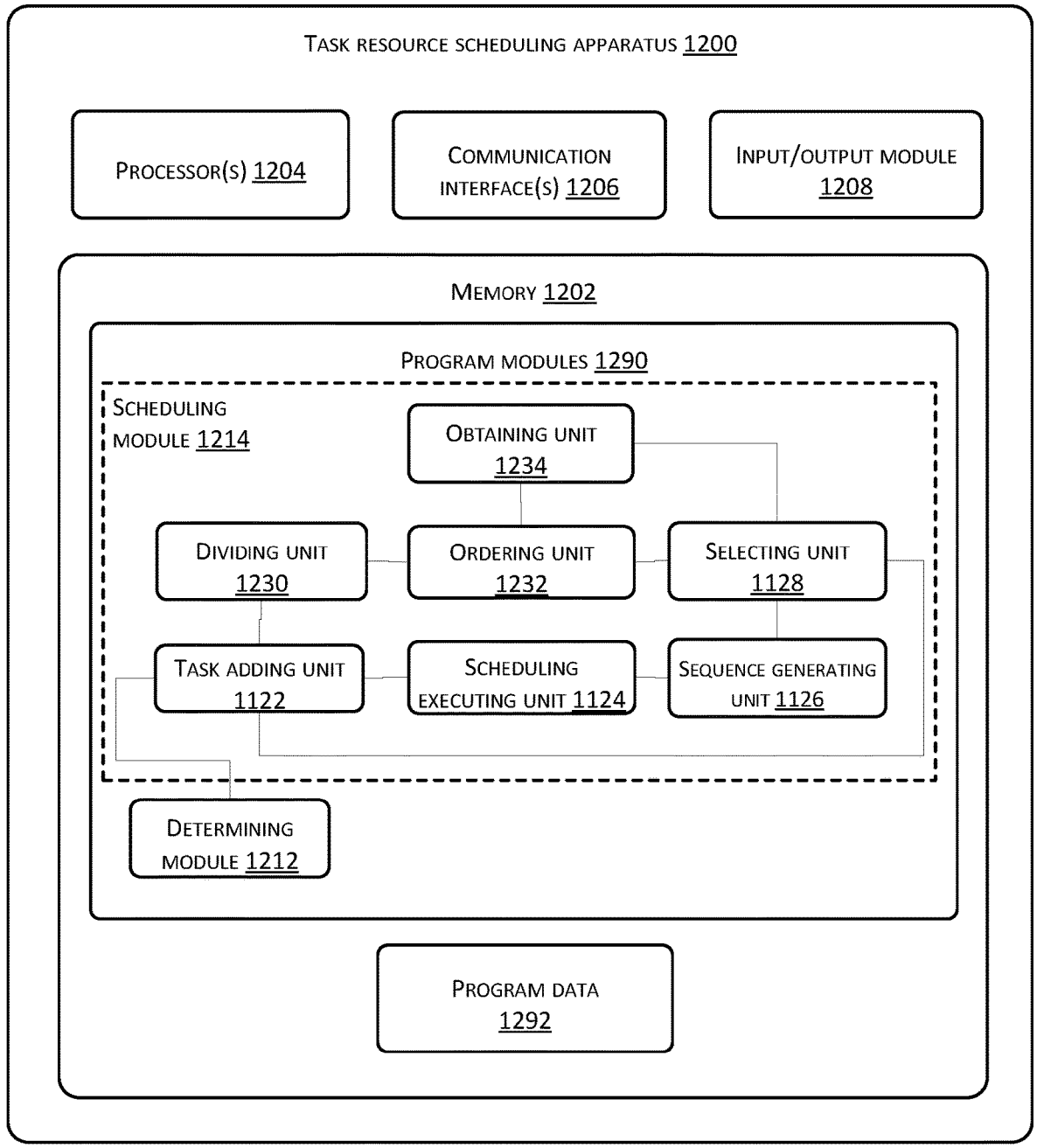
FIG. 12 is a diagram of a task resource scheduling apparatus according to a seventh example embodiment provided by the present disclosure.

FIG. 12 is a diagram of a task resource scheduling apparatus 1200 according to a seventh example embodiment provided by the present disclosure. As illustrated by FIG. 12, the task resource scheduling apparatus 1200 may include: memory 1202, one or more processors 1204, one or more communication interfaces 1206, and an input/output module 1208. The task resource scheduling apparatus may further include: a determining module 1212 and a scheduling module 1214. The scheduling module 1214, aside from including the task adding unit 1122, the scheduling executing unit 1124, the sequence generating unit 1126 and the selecting unit 1128 of the above-mentioned sixth example embodiment, also includes: a dividing unit 1230, an ordering unit 1232 and an obtaining unit 1234.

Herein, the dividing unit 1230 is stored in the memory 1202 and executable by the one or more processors 1204 to cause the one or more processors 1204 to divide task groups based on dependent relationships between tasks; wherein, each task group includes: a first-type task which detects data status, a second-type task which computes data and a third-type task which collects computation results; the second-type task depends upon the first-type task, and the third-type task directly depends upon the second-type task, and indirectly depends upon the first-type task.

The ordering unit 1232 is stored in the memory 1202 and executable by the one or more processors 1204 to cause the one or more processors 1204 to order according to a descending order of priority levels of task groups, as well as order tasks within each task group according to types of the tasks.

The selecting unit 1234 is stored in the memory 1202 and executable by the one or more processors 1204 to cause the one or more processors 1204 to obtain a first task awaiting scheduling from among the task groups in order, or to select all or some tasks from the task group having the highest priority level to generate a scheduled task sequence, and then, obtain a first task awaiting scheduling from among the task groups in order.

Furthermore, the obtaining unit 1234 is stored in the memory 1202 and executable by the one or more processors 1204 to cause the one or more processors 1204 to obtain a set deadline time of each task group, and based on the set deadline time obtain a corresponding task deadline time of each type of task.

Furthermore, the ordering unit 1232 in particular is further executable by the one or more processors 1204 to obtain running durations of each task among the task groups, and targeting each task group, individually multiply corresponding running durations and preset resource amounts occupied corresponding to tasks among the groups and then take a sum thereof to obtain a cumulative value of each task group, and based on the cumulative value of each task group priority level set up in advance for each group, find the priority level of each group, and order each task group based on a descending order of the obtained priority levels.

Furthermore, the ordering unit 1232 in particular is further executable by the one or more processors 1204 to, for each task group, collect historical data of tasks among the group within set time periods, analyze the historical data, obtain running information of the task groups, and based on running information of task groups, obtain running durations for each task within the task groups.

Furthermore, the obtaining unit 1234 is further executable by the one or more processors 1204 to evaluate whether the first task awaiting scheduling has a parent node task, and if a parent node task exists, based on the dependent relationships between the first task awaiting scheduling and other tasks among the task groups, obtain all parent node tasks of the first task awaiting scheduling, and designate the latest completion time among all the parent node tasks as the starting time of a first task awaiting scheduling.

In implementations, the memory 1202 may include program modules 1290 and program data 1292. The program modules 1290 may include one or more of the modules as described above.

A task resource scheduling apparatus provided by the present example embodiment, before adding a first task awaiting scheduling to a scheduled task sequence, performs grouping upon tasks, and orders task groups according to priority levels, performs ordering within groups according to types of the tasks, and after ordering obtains a first task awaiting scheduling according to the order. According to the present example embodiment, tasks associated with a same request are divided into one group, and with regard to a same task group, tasks of a same type among each group may be scheduled together, so that tasks among the task group may successively execute, and when obtaining the first task awaiting scheduling it is obtained according to the order, which is able to maintain each task group executing according to the order, ensuring as much as possible that tasks corresponding to high-importance requests preferentially obtain resources, and thereby may be preferentially executed, which is advantageous for the requests to present data at a frontend.

Persons of ordinary skill in the relevant art will appreciate that: implementing all or some steps of the various above-mentioned method example embodiments may be accomplished through hardware related to program instructions. The aforementioned programs may be stored on computer-readable storage mediums. When executing the instructions, execution includes the steps of the above-mentioned various method example embodiments; and each memory as recited by the above-mentioned example embodiments may include a form of computer readable media such as a volatile memory, a random access memory (RAM) and/or a non-volatile memory, for example, a read-only memory (ROM) or a flash RAM. Each memory as recited by the above-mentioned example embodiments is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Finally, it should be stated that: the above various example embodiments merely describe technical solutions of the present disclosure, and are not limiting thereto; although referencing the aforementioned various example embodiments provides detailed descriptions of the present disclosure, persons of ordinary skill in the relevant art will appreciate that: they may still make modifications to the technical solutions recorded in each aforementioned example embodiment, or make equivalent substitutions to part or all of the technical features therein; these modifications and substitutions do not cause the essence of their corresponding technical solutions to deviate from the scope of the technical solutions of each example embodiment of the present disclosure.

The present disclosure may further be understood with clauses as follows.

Clause 1. A task resource scheduling method, comprising:
determining priority levels and set task deadline times of multiple tasks;
determining a preset resource upper bound; and
based on task priority levels scheduling a successive order of executing the multiple tasks, the post-scheduling tasks satisfying a first condition, the first condition being that a section exists on a time series where more than one task overlaps, and a sum of resources occupied in the section having the overlap is greater than the resource upper bound.

Clause 2. The method of clause 1, wherein the post-scheduling tasks further satisfy a second condition: completion times of all the tasks do not exceed the set task deadline times.

Clause 3. The method of clause 2, further comprising:
if tasks exist that cannot satisfy the first condition and the second condition, placing the tasks for processing after scheduling is completed for other tasks.

Clause 4. The method of one of the clauses 1 to 3, wherein based on the task priority levels scheduling the successive order of executing the multiple tasks comprises:
based on the priority levels of the tasks and dependent relationships between the tasks, schedule the successive order of executing the multiple tasks.

Clause 5. The method of clause 4, wherein tasks of different types exist among the multiple tasks, and a time resource conflict, in particular, is that a section exists on a time series where more than one task of a same type overlaps, and the sum of the resources occupied in the section having the overlap is greater than the resource upper bound.

Clause 6. The method of clause 1, further comprising composing a scheduled task sequence from the post-scheduling tasks; and
wherein based on the task priority levels scheduling the successive order of executing the multiple tasks, the post-scheduling tasks satisfying the first condition comprises:
adding a first task awaiting scheduling to the scheduled task sequence, the priority levels of the tasks among the scheduled task sequence being higher than or equal to a priority level of the first task awaiting scheduling, and the scheduled task sequence satisfying the first condition;
adjusting rearward along the time series one or more first overlapping tasks which, with the first task awaiting scheduling, produce a time resource conflict, or, adjusting rearward along the time series one or more first overlapping tasks as well as all or some tasks of a same type as the first task awaiting scheduling on a subsequent time series, and generating a post-adjustment task sequence satisfying the first condition and a second condition:
wherein, the second condition is: completion times of all the tasks do not exceed the respective set task deadline times;
if a post-scheduling task sequence satisfying the first condition and the second condition exists, saving the post-scheduling task sequence as a scheduled task sequence, and if a post-scheduling task sequence satisfying the first condition and the second condition does not exist, abandoning adding the first task awaiting scheduling to the scheduled task sequence; and
selecting a new unscheduled task designated as a first task awaiting scheduling, and executing again the process of adding the first task awaiting scheduling to the scheduled task sequence, until all the unscheduled tasks have finished processing.

Clause 7. The method of clause 6, further comprising:
if adding the first task does not result in the time resource conflict, saving the task sequence having the first task awaiting scheduling added as the scheduled task sequence.

Clause 8. The method of one of the clauses 6 or 7, further comprising:
after all the unscheduled tasks have finished processing, selecting an abandoned first task awaiting scheduling designated as a second task awaiting scheduling, and carrying out a below second scheduling operation:
starting the second task awaiting scheduling at a tail end of the scheduled task sequence, moving frontward along the time series, and selecting a foremost position satisfying a below third condition designated as an ultimate position of the second task awaiting scheduling, the third condition being that a time resource conflict does not exist for a task sequence after adding the second task awaiting scheduling.

Clause 9. The method of clause 6, further comprising:
during the operation of adjusting rearward along the time series the one or more first overlapping tasks as well as all or some tasks of a same type as the first task awaiting scheduling on the subsequent time series, maintaining a successive order of tasks of the same type among the scheduled task sequence.

Clause 10. The method of clause 6, wherein adjusting rearward along the time series the one or more first overlapping tasks as well as all or some tasks of the same type as the first task awaiting scheduling on the subsequent time series comprises:
moving the one or more first overlapping tasks designated as target task(s) rearward along the time series until the time resource conflict(s) produced by the target task(s) disappear(s), then stopping;
if the completion time(s) of the target task(s) post-moving do(es) not exceed their set task deadline times, further evaluating whether, post-moving, a second overlapping task exists which produces a time resource conflict with the target task(s), and if, post-moving, a second overlapping task exists which produces a time resource conflict with the target task(s), designating one or more second overlapping tasks as the new target task(s) and executing again the above-mentioned operation of moving the target task(s) rearward along the time series, and if a second overlapping task which produces a time resource conflict with the target task(s) does not exist, designating the current task sequence saved as the scheduled task sequence; and
if the completion time(s) of the target task(s) post-moving exceed their set task deadline time(s), deciding that a post-scheduling task sequence satisfying the first condition and the second condition does not exist, and abandoning the operation of adding the first task awaiting scheduling to the scheduled task order.

Clause 11. The method of clause 6, wherein the time series includes time points composed of starting times and completion times of each task contained in the scheduled task sequence, and when adjusting tasks along the time series, in particular tasks are adjusted along the time points of the time series.

Clause 12. The method of cause 6, wherein adding the first task awaiting scheduling to the scheduled task sequence comprises:
dividing task groups based on dependent relationships between tasks; wherein, each task group includes: a first-type task which detects data status, a second-type task which computes data and a third-type task which collects computation results; the second-type task depending upon the first-type task, and the third-type task directly depending upon the second-type task, and indirectly depending upon the first-type task;
ordering task groups according to a descending order of their priority levels;
ordering tasks within each task group according to types of the tasks;
obtaining a first task awaiting scheduling from among the task groups in order, or selecting all or some tasks from the task group having the highest priority level to generate a scheduled task sequence, and then, obtaining a first task awaiting scheduling from among the task groups in order.

Clause 13. The method of clause 12, further comprising, after dividing task groups based on dependent relationships between tasks;
obtaining a set deadline time of each task group; and
based on the set deadline time obtaining a corresponding task deadline time of each type of task.

Clause 14. The method of clause 13, wherein ordering task groups according to the descending order of their priority levels comprises:
obtaining a running duration of each task among the task group;
targeting each task group, individually multiplying the running duration and the resources occupied for each task and then taking a sum thereof to find a cumulative value of each task group;
based on the cumulative value of each task group and a preset level of each task group, finding a priority level of each task group; and
ordering each task group according to priority levels from largest to smallest.

Clause 15. The method of clause 14, wherein obtaining a running duration of each task among the task group comprises:
targeting each task group, collecting historical data of tasks within each group within set time periods;
analyzing the historical data, and obtaining running information of the task groups; and
based on the running information of the task groups, obtaining running durations for each task within the task groups.

Clause 16. The method of clause 15, further comprising, after obtaining the first task awaiting scheduling from among the task groups according to the order:
evaluating whether the first task awaiting scheduling has a parent node task;
if a parent node task exists, based on a dependent relationship between the first task awaiting scheduling and other tasks among the task groups, obtaining all parent node tasks of the first task awaiting scheduling; and
designating the latest completion time among all the parent node tasks as the starting time of a first task awaiting scheduling.

Clause 17. A task resource scheduling apparatus, comprising:
a determining module, operative to determine priority levels of multiple tasks, set task deadline times, and preset resource upper bounds;
a scheduling module, operative to, based on task priority levels, schedule a successive order of executing the multiple tasks, the post-scheduling tasks satisfying a first condition, the first condition being that a time resource conflict does not exist between tasks, and the time resource conflict being that a section exists on a time series where more than one task overlaps, and a sum of the resources occupied in the section having the overlap is greater than the resource upper bound.

Clause 18. The apparatus of clause 17, wherein the post-scheduling tasks further satisfy a second condition: completion times of all the tasks do not exceed the respective set task deadline times.

Clause 19. The apparatus of clause 18, wherein the scheduling module is further operative to, if tasks exist that cannot satisfy the first condition and the second condition, place the tasks for processing after scheduling is completed for other tasks.

Clause 20. The apparatus of one of the clauses 17 or 19, wherein the scheduling module is further operative to, based on the priority levels of the tasks and dependent relationships between the tasks, schedule the successive order of executing multiple tasks.

Clause 21. The apparatus of clause 20, wherein tasks of different types exist among the multiple tasks, and a time resource conflict, in particular, is that a section exists on a time series where more than one task of a same type overlaps, and the sum of the resources occupied in the section having the overlap is greater than the resource upper bound.

Clause 22. The apparatus of clause 17, wherein a scheduled task sequence is composed from the post-scheduling tasks; and
wherein the scheduling module comprises:
a task adding unit operative to add a first task awaiting scheduling to the scheduled task sequence, the priority levels of the tasks among the scheduled task sequence being higher than or equal to a priority level of the first task awaiting scheduling, the scheduled task sequence satisfying a first condition;
a scheduling executing unit operative to, if adding the first task awaiting scheduling results in a time resource conflict, execute a first scheduling operation as follows:
adjust rearward along the time series one or more first overlapping tasks which, with the first task awaiting scheduling, produce a time resource conflict, or, adjust rearward along the time series one or more first overlapping tasks as well as all or some tasks of a same type as the first task awaiting scheduling on a subsequent time series, and generate a post-adjustment task sequence satisfying the first condition and a second condition:
wherein, the second condition is: completion times of all the tasks do not exceed the respective set task deadline times; and
a sequence generating unit operative to, if a post-scheduling task sequence satisfying the first condition and the second condition exists, save it as a scheduled task sequence, and if it does not exist, abandon adding the first task awaiting scheduling to the scheduled task sequence; and a selecting unit operative to select a new unscheduled task designated as a first task awaiting scheduling, and execute again the process of adding the first task awaiting scheduling to the scheduled task sequence, until all the unscheduled tasks have finished processing.

Clause 23. The apparatus of clause 22, wherein the sequence generating unit is further operative to, if adding the first task awaiting scheduling does not result in a time resource conflict, save the task sequence having the first task awaiting scheduling added as the scheduled task sequence.

Clause 24. The apparatus of one of the clauses 22 or 23, wherein the selecting unit is further operative to, after all the unscheduled tasks have finished processing, select an abandoned first task awaiting scheduling designated as a second task awaiting scheduling, and carry out a below second scheduling operation:

starting the second task awaiting scheduling at a tail end of the scheduled task sequence, movie frontward along the time series, and select a foremost position satisfying a below third condition designated as an ultimate position of the second task awaiting scheduling, the third condition being that a time resource conflict does not exist for a task sequence after adding the second task awaiting scheduling.

Clause 25. The apparatus of clause 22, wherein during the operation of adjusting rearward along the time series the one or more first overlapping tasks as well as all or some tasks of a same type as the first task awaiting scheduling on the subsequent time series, a successive order of tasks of the same type among the scheduled task sequence is maintained.

Clause 26. The apparatus of clause 22, wherein the scheduling executing unit is further operative to, in particular, move one or more first overlapping tasks designated as a target task(s) rearward along the time series until the time resource conflict(s) produced by the target task(s) disappear(s), then stop, and if the completion time(s) of the target task(s) post-moving do(es) not exceed their set task deadline times, then further evaluate whether, post-moving, a second overlapping task exists which produces a time resource conflict with the target task(s), and if one exists, designate the one or more second overlapping tasks as the new target task(s) and execute the above-mentioned operation of moving the target task(s) rearward along the time series again, and if one does not exist, designate the current task sequence saved as the scheduled task sequence, and if the completion time(s) of the target task(s) post-moving exceed their set task deadline time(s), decide that a post-scheduling task sequence satisfying the first condition does not exist, and abandon the operation of adding the first task awaiting scheduling to the scheduled task order.

Clause 27. The apparatus of clause 22, wherein the time series includes time points composed of the starting times and completion times of each task contained in the scheduled task sequence, and when adjusting tasks along the time series, in particular tasks are adjusted along the time points of the time series.

Clause 28. The apparatus of clause 22, where the scheduling module further comprises:

a dividing unit operative to divide task groups based on dependent relationships between tasks; wherein, each task group includes: a first-type task which detects data status, a second-type task which computes data and a third-type task which collects computation results; the second-type task depending upon the first-type task, and the third-type task directly depending upon the second-type task, and indirectly depending upon the first-type task; and an ordering unit operative to order according to a descending order of priority levels of task groups, as well as order tasks within each task group according to types of the tasks; and wherein the selecting unit is further operative to obtain a first task awaiting scheduling from among the task groups in order, or to select all or some tasks from the task group having the highest priority level to generate a scheduled task sequence, and then, obtain a first task awaiting scheduling from among the task groups in order.

Clause 29. The apparatus of clause 28, wherein the scheduling module further comprises:

an obtaining unit operative to obtain a set deadline time of each task group, and based on the set deadline time obtain a corresponding task deadline time of each type of task.

Clause 30. The apparatus of clause 29, wherein the ordering unit in particular is further operative to obtain running durations of each task among the task groups, and targeting each task group, individually multiply the corresponding running durations and preset resource amounts occupied corresponding to tasks among the groups, and then take a sum thereof to find a cumulative value of each task group, and based on the cumulative value of each task group priority level set up in advance for each group, find the priority level of each group, and order each task group based on a descending order of the obtained priority levels.

Clause 31. The apparatus of clause 30, wherein the ordering unit in particular is further operative to, for each task group, collect historical data of tasks among the group within set time periods, analyze the historical data, obtain running information of the task groups, and based on the running information of the task groups, obtain running durations for each task within the task groups.

Clause 32. The apparatus of clause 31, wherein the obtaining unit is further operative to evaluate whether the first task awaiting scheduling has a parent node task, and if a parent node task exists, based on the dependent relationships between the first task awaiting scheduling and other tasks among the task groups, obtain all parent node tasks of the first task awaiting scheduling, and designate the latest completion time among all the parent node tasks as the starting time of a first task awaiting scheduling.

What is claimed is:
1. A method comprising:
determining priority levels and set task deadline times of multiple tasks;
determining a preset resource upper bound;
scheduling, based on task priority levels, a successive order of executing multiple tasks, post-scheduling tasks satisfying a first condition, the first condition being that a time resource conflict does not exist for the tasks, a time resource conflict being that a section exists on a time series where more than one task overlaps, and a sum of the resources occupied in the section having the overlap is greater than the resource upper bound;
wherein scheduling, based on task priority levels, the successive order of executing multiple tasks, the post-scheduling tasks satisfying a first condition comprises:
adding a first task awaiting scheduling to the scheduled task sequence, the priority levels of the tasks among the scheduled task sequence being higher than or equal to the priority level of the first task awaiting scheduling, and the scheduled task sequence satisfying the first condition;

adjusting rearward along the time series at least one or more first overlapping tasks which, with the first task awaiting scheduling, produce a time resource conflict and generating a post-adjustment task sequence satisfying the first condition and a second condition;

the second condition being that the completion times of all the tasks do not exceed the respective set task deadline times; and saving, upon determining that a post-scheduling task sequence satisfying the first condition and the second condition exists, the post-scheduling task sequence as a scheduled task sequence.

2. The method of claim 1, further comprising composing a scheduled task sequence from the post-scheduling tasks; and wherein scheduling, based on task priority levels, the successive order of executing multiple tasks, the post-scheduling tasks satisfying a first condition further comprises:

abandoning, upon determining that a post-scheduling task sequence satisfying the first condition and the second condition does not exist, adding the first task awaiting scheduling to the scheduled task sequence; and selecting a new unscheduled task designated as a first task awaiting scheduling, and executing again the process of adding the first task awaiting scheduling to the scheduled task sequence, until all the unscheduled tasks have finished processing.

3. The method of claim 2, further comprising:

saving, upon determining that adding the first task does not result in the time resource conflict, the task sequence having the first task awaiting scheduling added as the scheduled task sequence.

4. The method of claim 2, further comprising:

selecting, after all the unscheduled tasks have finished processing, an abandoned first task awaiting scheduling designated as a second task awaiting scheduling, and performing a second scheduling operation comprising:

moving the second task awaiting scheduling frontward along the time series starting at a tail end of the scheduled task sequence, and selecting the foremost position satisfying a third condition designated as an ultimate position of the second task awaiting scheduling, the third condition being that a time resource conflict does not exist for the task sequence after adding the second task awaiting scheduling.

5. The method of claim 2, wherein adjusting rearward along the time series at least one or more first overlapping tasks comprises:

moving the one or more first overlapping tasks designated as target task(s) rearward along the time series until the time resource conflict(s) produced by the target task(s) disappear(s), then stopping;

evaluating, upon determining that the completion time(s) of the target task(s) post-moving do(es) not exceed their set task deadline times, whether, post-moving, a second overlapping task exists which produces a time resource conflict with the target task(s);

designating, upon determining that post-moving, a second overlapping task exists which produces a time resource conflict with the target task(s), one or more second overlapping tasks as the new target task(s) and executing again the above-mentioned operation of moving the target task(s) rearward along the time series;

designating, upon determining that a second overlapping task which produces a time resource conflict with the target task(s) does not exist, the current task sequence saved as the scheduled task sequence; and deciding, upon determining that the completion time(s) of the target task(s) post-moving exceed their set task deadline time(s), that a post-scheduling task sequence satisfying the first condition and the second condition does not exist, and abandoning the operation of adding the first task awaiting scheduling to the scheduled task order.

6. The method of claim 2, wherein adding a first task awaiting scheduling to the scheduled task sequence comprises:

dividing task groups based on dependent relationships between tasks, wherein each task group includes: a first-type task which detects data status; a second-type task which computes data; and a third-type task which collects computation results; the second-type task depending upon the first-type task, and the third-type task directly depending upon the second-type task, and indirectly depending upon the first-type task;

ordering task groups according to a descending order of the respective priority level of each task group;

ordering tasks within each task group according to types of the tasks;

obtaining a first task awaiting scheduling from among the task groups in order.

7. The method of claim 6, further comprising, after dividing task groups based on dependent relationships between tasks;

obtaining a set deadline time of each task group; and obtaining, based on the set deadline time, a corresponding task deadline time of each type of task.

8. The method of claim 7, wherein ordering task groups according to the descending order of the respective priority level of each task group comprises:

obtaining a running duration of each task among the task group;

multiplying, targeting each task group, the running duration and the resources occupied for each task and summing to find a cumulative value of each task group;

finding, based on the cumulative value of each task group and a preset level of each task group, a priority level of each task group; and ordering each task group according to priority levels from largest to smallest.

9. The method of claim 8, wherein obtaining a running duration of each task among the task group comprises:

collecting, targeting each task group, historical data of tasks within each group within set time periods;

analyzing the historical data, and obtaining running information of the task groups; and obtaining, based on the running information of the task groups, running durations for each task within the task groups.

10. The method of claim 9, further comprising, after obtaining the first task awaiting scheduling from among the task groups according to the order:

evaluating whether the first task awaiting scheduling has a parent node task;

obtaining, upon determining that a parent node task exists, based on a dependent relationship between the first task awaiting scheduling and other tasks among the task groups, all parent node tasks of the first task awaiting scheduling; and designating the latest completion time among all the parent node tasks as the starting time of a first task awaiting scheduling.

11. An apparatus comprising:
one or more processors;
memory;
a determining module stored in the memory and executable by the one or more processors to cause the one or more processors to determine priority levels of multiple tasks, set task deadline times, and preset resource upper bounds;
a scheduling module stored in the memory and executable by the one or more processors to cause the one or more processors to schedule, based on task priority levels, a successive order of executing multiple tasks, post-scheduling tasks satisfying a first condition, the first condition being that a time resource conflict does not exist between tasks, and the time resource conflict being that a section exists on a time series where more than one task overlaps, and a sum of the resources occupied in the section having the overlap is greater than the resource upper bound;
wherein the scheduling module comprises:
a task adding unit stored in the memory and executable by the one or more processors to add a first task awaiting scheduling to the scheduled task sequence, the priority levels of the tasks among the scheduled task sequence being higher than or equal to the priority level of the first task awaiting scheduling, the scheduled task sequence satisfying a first condition;
adjust rearward along the time series at least one or more first overlapping tasks which, with the first task awaiting scheduling, produce a time resource conflict, and generate a post-adjustment task sequence satisfying the first condition and a second condition;
the second condition being that the completion times of all the tasks do not exceed the respective set task deadline times; and
a sequence generating unit stored in the memory and executable by the one or more processors to cause the one or more processors to save, upon determining that a post-scheduling task sequence satisfying the first condition and the second condition exists, the post-scheduling task sequence satisfying the first condition and the second condition as a scheduled task sequence.

12. The apparatus of claim 11, wherein a scheduled task sequence is composed from the post-scheduling tasks; and
wherein the scheduling module further comprises:
a scheduling executing unit stored in the memory and executable by the one or more processors to cause the one or more processors to execute, upon determining that adding the first task awaiting scheduling results in a time resource conflict, execute a first scheduling operation as follows:
the sequence generating unit stored in the memory and executable by the one or more processors to cause the one or more processors to abandon, upon determining that a post-scheduling task sequence satisfying the first condition and the second condition does not exist, adding the first task awaiting scheduling to the scheduled task sequence; and
a selecting unit stored in the memory and executable by the one or more processors to cause the one or more processors to select a new unscheduled task designated as a first task awaiting scheduling, and execute again the process of adding the first task awaiting scheduling to the scheduled task sequence, until all the unscheduled tasks have finished processing.

13. The apparatus of claim 12, wherein the sequence generating unit is further executable by the one or more processors to cause the one or more processors to, if adding the first task awaiting scheduling does not result in a time resource conflict, save the task sequence having the first task awaiting scheduling added as the scheduled task sequence.

14. The apparatus of claim 12, wherein the selecting unit is further executable by the one or more processors to cause the one or more processors to select, after all the unscheduled tasks have finished processing, an abandoned first task awaiting scheduling designated as a second task awaiting scheduling, and perform a second scheduling operation comprising:
moving the second task awaiting scheduling frontward along the time series starting at a tail end of the scheduled task sequence, and selecting the foremost position satisfying a third condition designated as an ultimate position of the second task awaiting scheduling, the third condition being that a time resource conflict does not exist for the task sequence after adding the second task awaiting scheduling.

15. The apparatus of claim 12, wherein the scheduling executing unit is further executable by the one or more processors to cause the one or more processors to:
move one or more first overlapping tasks designated as a target task(s) rearward along the time series until the time resource conflict(s) produced by the target task(s) disappear(s), then stop;
evaluate, upon determining that the completion time(s) of the target task(s) post-moving do(es) not exceed their set task deadline times, whether, post-moving, a second overlapping task exists which produces a time resource conflict with the target task(s);
designate, upon determining that, post-moving, a second overlapping task exists which products a time resource conflict with the target task(s), the one or more second overlapping tasks as the new target task(s) and execute the above-mentioned operation of moving the target task(s) rearward along the time series again;
designate, upon determining that, post-moving, a second overlapping task which produces a time resource conflict with the target task(s) does not exist, the current task sequence saved as the scheduled task sequence;
decide, upon determining that the completion time(s) of the target task(s) post-moving exceed their set task deadline time(s), that a post-scheduling task sequence satisfying the first condition does not exist, and abandon the operation of adding the first task awaiting scheduling to the scheduled task order.

16. The apparatus of claim 12, where the scheduling module further comprises:
a dividing unit stored in the memory and executable by the one or more processors to cause the one or more processors to divide task groups based on dependent relationships between tasks; wherein each task group includes: a first-type task which detects data status; a second-type task which computes data; and a third-type task which collects computation results; the second-type task depending upon the first-type task, and the third-type task directly depending upon the second-type task, and indirectly depending upon the first-type task; and an ordering unit stored in the memory and executable by the one or more processors to cause the one or more processors to order according to a descending order of priority levels of task groups, as well as order tasks within each task group according to types of the tasks; and wherein the selecting unit is further executable by the one or more processors to cause the one or more processors to obtain a first task awaiting scheduling from among the task groups in order.

17. The apparatus of claim 16, wherein the scheduling module further comprises:

an obtaining unit stored in the memory and executable by the one or more processors to cause the one or more processors to obtain a set deadline time of each task group, and obtain, based on the set deadline time, a corresponding task deadline time of each type of task.

18. The apparatus of claim 17, wherein the ordering unit is further executable by the one or more processors to cause the one or more processors to obtain running durations of each task among the task groups, and targeting each task group, multiply and then sum the corresponding running durations and preset resource amounts occupied corresponding to tasks among the groups, find a cumulative value of each task group, and based on the cumulative value of each task group priority level set up in advance for each group, find the priority level of each group, and order each task group based on a descending order of the obtained priority levels.

19. The apparatus of claim 18, wherein the ordering unit is further executable by the one or more processors to cause the one or more processors to, for each task group, collect historical data of tasks among the group within set time periods, analyze the historical data, obtain running information of the task groups, and obtain, based on the running information of the task groups, running durations for each task within the task groups.

20. The apparatus of claim 19, wherein the obtaining unit is further executable by the one or more processors to cause the one or more processors to evaluate whether the first task awaiting scheduling has a parent node task; and obtain, upon determining that a parent node task exists, based on the dependent relationships between the first task awaiting scheduling and other tasks among the task groups, all parent node tasks of the first task awaiting scheduling, and designate the latest completion time among all the parent node tasks as the starting time of a first task awaiting scheduling.

* * * * *